(12) United States Patent
Kozubal et al.

(10) Patent No.: US 7,925,167 B1
(45) Date of Patent: Apr. 12, 2011

(54) SATELLITE DOWNLINK VIA PATTERNS OF UNCOLLIMATED LIGHT

(76) Inventors: Marek J. Kozubal, Belmont, MA (US); Terence Sean Sullivan, Somerville, MA (US)

( * ) Notice: Subject to any disclaimer, the term of this patent is extended or adjusted under 35 U.S.C. 154(b) by 743 days.

(21) Appl. No.: 11/981,419

(22) Filed: Oct. 31, 2007

(51) Int. Cl.
*H04B 10/00* (2006.01)

(52) U.S. Cl. ........ 398/125; 398/118; 398/121; 398/124; 398/128; 398/130; 455/12.1; 455/3.02; 455/427; 455/452.1

(58) Field of Classification Search .......... 398/118, 398/119, 120, 121, 122, 123, 124, 125, 126, 398/127, 128, 129, 130, 135, 136, 137, 138, 398/139, 140, 68, 79, 115, 116, 117, 131, 398/182, 183, 202, 207, 208, 209, 212, 213; 455/12.1, 3.02, 427, 452.1
See application file for complete search history.

(56) References Cited

U.S. PATENT DOCUMENTS

| | | | |
|---|---|---|---|
| 5,291,325 A | 3/1994 | Elliott | |
| 5,296,950 A | 3/1994 | Lin et al. | |
| 5,726,786 A | 3/1998 | Heflinger | |
| 5,815,966 A | 10/1998 | Vestevich | |
| 6,085,128 A | 7/2000 | Middour et al. | |
| 6,268,944 B1 | 7/2001 | Szapiel | |
| 6,301,037 B1 | 10/2001 | Fischer et al. | |
| 6,304,354 B2 | 10/2001 | Carlson | |
| 6,377,211 B1 | 4/2002 | Hsiung | |
| 6,449,076 B1 | 9/2002 | Loveridge et al. | |
| 6,778,779 B1 | 8/2004 | Shay et al. | |
| 7,046,934 B2 | 5/2006 | Badesha et al. | |
| 2005/0100339 A1* | 5/2005 | Tegge | 398/125 |
| 2008/0002981 A1* | 1/2008 | Valley et al. | 398/121 |

* cited by examiner

*Primary Examiner* — Hanh Phan

(57) ABSTRACT

A satellite or spacecraft in low Earth orbit, when in eclipse and not illuminated by sunlight, represents a low-bandwidth datastream through modulation of a source of uncollimated light, such as a set of light emitting diodes. Transmission modes include generating patterns in the color, intensity or polarization of a light source, or precise timing control of a strobe signal. A ground station tracks the satellite in a telescope, stewing the telescope to follow the satellite as it moves across the sky, recording light generated by the satellite with a light sensor such as a video camera. The datastream is regenerated through analysis of recorded video. Satellite downlink is initiated by detection of eclipse, by command via radio uplink, or in response to a periodic automatic timer. In an alternative embodiment, the satellite represents the datastream through modulation of its effective albedo or reflective flux during periods of solar illumination.

20 Claims, 7 Drawing Sheets

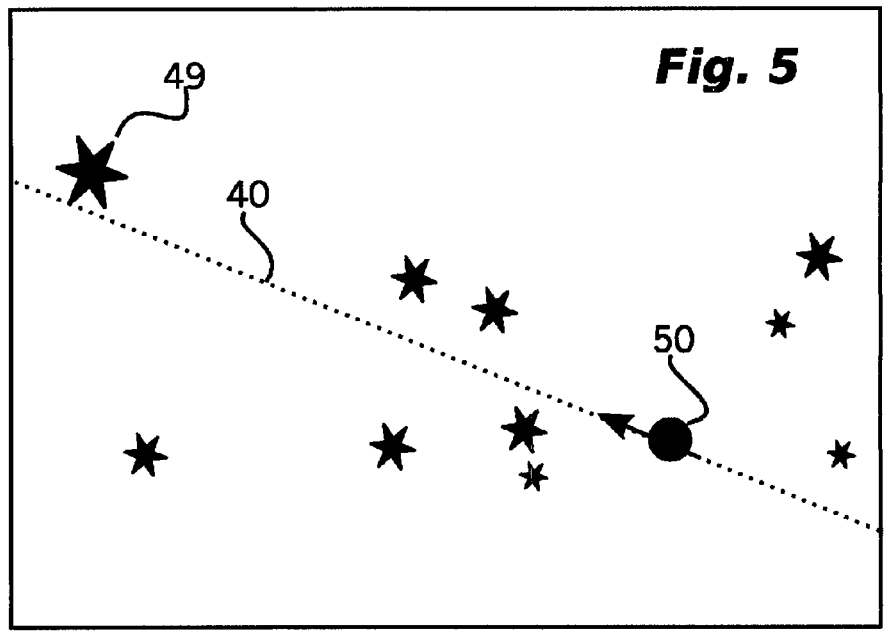
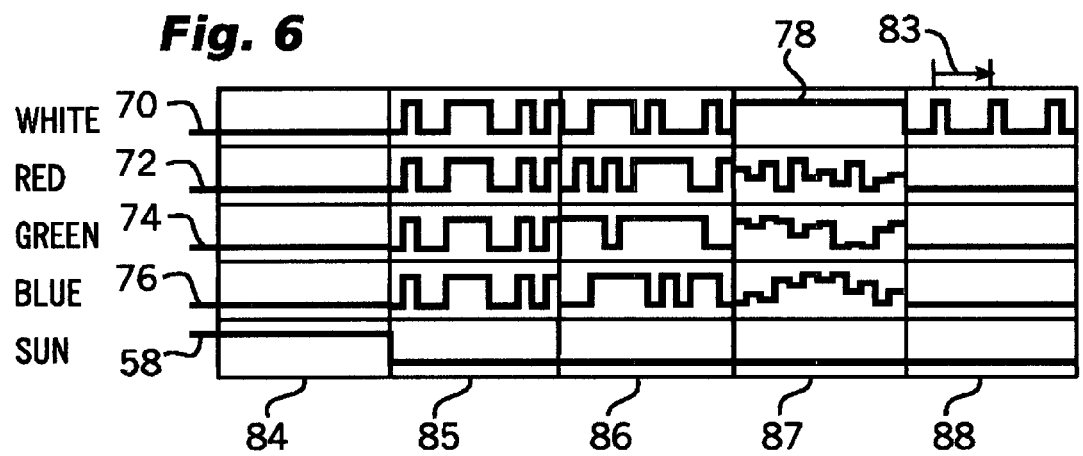

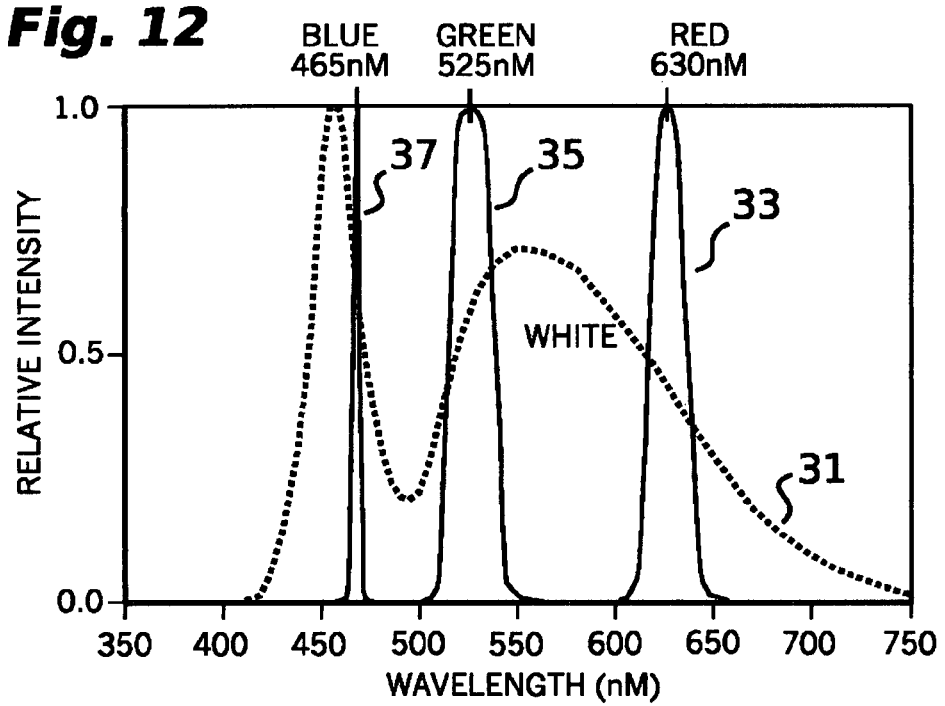

SATELLITE DOWNLINK VIA PATTERNS OF UNCOLLIMATED LIGHT

FIELD OF THE INVENTION

This invention relates to satellite communications, specifically to the downlink of data through spacecraft modulation of an uncollimated light source observed at a ground station equipped with a tracking telescope and an imaging system.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The operational functions of artificial Earth satellites usually require the downlink of data to ground stations. Examples of downlinked data include engineering telemetry, sensor readings, scientific measurements, or relayed communications information passed from an uplink signal. Radio transmission is a ubiquitous method for satellite downlink in the present art. A few satellites have supplementary lasers, generating a narrow beam of collimated light, for additional high-bandwidth downlink capacity to a ground station within the laser beam.

The operation of radio transmitters in space is highly regulated, primarily due to the risk of interference with other signals. Satellites operate at an extremely high altitude compared to terrestrial radio sources, and a large portion of the Earth's surface is in direct line-of-sight from a satellite at any time. Satellites in near-Earth orbit move rapidly around the globe, and pass directly over numerous nations and geographic regions. A malfunctioning radio transmitter in space has the potential of causing interference to terrestrial radio communications anywhere on the planet. Control of a malfunctioning radio transmitter in space can be impossible, since it is physically inaccessible to maintenance personnel. For this reason, regulations governing the use of radio transmitters in space require the availability of an uplink channel, so that a ground station can remotely command the shutdown of the satellite's transmitter. This safety precaution, however, cannot protect against a failure in a satellite's control system that effectively severs control of the radio transmitter, or a failure in a satellite's uplink receiver that interferes with the satellite's ability to receive ground commands.

For several reasons, compliance with regulations governing operation of a radio transmitter in space can be burdensome to the development of small 'microsatellites' or 'nanosatellites', extremely small spacecraft constructed using minimal mass and complexity. Small satellites are beneficial due to the ability to 'piggyback' on surplus launch capacity, the potential use in 'swarms' where numerous low-cost spacecraft collectively provide regional coverage or undertake high-risk activities, and educational value when spacecraft design or construction occurs in the context of an academic project.

One compliance burden is the requirement for inclusion of a potentially unnecessary subsystem on the spacecraft, an uplink communications receiver. Some satellites may have reason to return data to Earth, but have no inherent need for an uplink channel, other than providing the capacity for remote shutdown of the downlink transmitter. Examples include evaluation of thermal or attitude performance of spacecraft prototype configurations, long-duration testing of the performance and reliability of components that have not been qualified for use in critical spacecraft functions, and measurement of transient events such as space debris or micrometeroid impacts.

Another compliance burden is working through the process for obtaining permission to broadcast from space on an assigned radio frequency. This may introduce significant expense or delay, and is problematic for spacecraft that must be developed on a very short time scale. For example, an unexpected launch opportunity may be generated when a manifested secondary payload is removed from a rocket for technical reasons, or when evaluation of primary payload mass reveals unused mass to orbit capacity that may be utilized by the addition of a small secondary payload. Developers of very small spacecraft cannot purchase dedicated launch vehicles, and rely on the ability to respond promptly to such unanticipated circumstances. In this context, risk is introduced by the necessity of certification for a transmitter shutdown system and regulatory authorization to use a specific downlink radio frequency.

Various methods are known for short-range optical communications using uncollimated light. For example, optocouplers use uncollimated light to transfer information within an electrical component or circuit board, and television remote control devices use uncollimated infrared optical signals to communicate over a few meters. When devices can be physically connected, fiberoptics can be used to extend the communications range. Optical communications systems requiring greater performance are typically implemented with lasers. U.S. Pat. No. 5,726,786 to Heflinger (1998) describes the implementation of an uncollimated optical data bus for connecting subsystems within a spacecraft, or for communications between a spacecraft and other equipment virtually in contact with the spacecraft (e.g. to ground support equipment on the launch tower before liftoff, or to another docking spacecraft in orbit). The effective range of an optical data bus is measured on the order of centimeters or a few meters, evidently not useful for communications between Earth and an orbiting satellite, where the ranges are at least hundreds of kilometers. Further, an optical data bus captures and retransmits optical signals to interconnect a plurality of optical transceivers with bidirectional communications paths between any pair of transceivers, and does not provide for the outbound broadcast of information from a single data source, without optical relay, to optical receive-only stations with no symmetric capacity for participation in the optical data bus, and possibly in a plurality of locations unknown to the optical transmission source.

For optical communications over longer ranges, such as between Earth and a satellite, laser optical downlink systems have been developed as an alternative to radio. However, laser transmission from a satellite requires extremely precise control of the spacecraft's orientation, so that the narrow laser beam is delivered to a ground station facility. The directionality of a laser beam is a primary motivation for the development of laser satellite communications in the prior art, and is specifically cited as an advantage of such methods. As explained in U.S. Pat. No. 6,097,522 to Maerki, et al (2000): "Thanks to the extremely short wavelength of light, an optical beam can be radiated very easily by means of a relatively small optical device at a narrow space angle. By means of the antenna gain achieved in this way, a high data rate can be transmitted with low transmission output. Corresponding directional antennas for microwave connections are comparatively heavy and require a relatively large space. However, because an optical transmitted beam can be easily collimated, it requires an extremely exact determination and tracking of the direction of the transmitted beam as well as that of the reception direction."

According to U.S. Pat. No. 6,922,430 to Biswas, et al (2005), "In order for a satellite to optically communicate with a ground station, it must be able to orient its antenna, which is often highly directional, toward the ground station. The ground station must therefore send up a directional beacon to the satellite on which the satellite can lock for orientation purposes." The pointing accuracy required for laser communications is extraordinary. U.S. Pat. No. 5,475,520 to Wissinger (1995) notes that "Optical beams of sufficient brightness are typically tens of microradians in diameter, while the corresponding requirement for RF beamwidths is generally on the order of one to two degrees. Acquisition and tracking of the beam is problematic in that the beam must be pointed at a remote transceiver with microradian accuracy."

To put this in perspective, the angular diameter of a typical downlink laser beam is smaller than the angular diameter of the planet Neptune in Earth's sky. Aiming a satellite with such precision is, indeed, "problematic". The task is so demanding that optical downlink, with the present art, is simply out of reach for nanosatellites. Further, the narrow size of a laser beam makes such a system unacceptable as a satellite's primary downlink system, since the process of co-ordinating a laser downlink session may require two-way communications with the spacecraft, and reliance on an extremely directional downlink would make recovery practically impossible from a spacecraft anomaly or "safe mode" condition.

In addition, the narrow illumination footprint of a laser downlink signal on the Earth's surface, typically smaller than 1,000 feet in diameter, makes reception contingent on favorable weather conditions at the observing site. This is a known disadvantage to laser downlink systems, and satellite detection from high-altitude balloons have been proposed to overcome this limitation, as in U.S. Pat. No. 7,046,934 to Badesha, et al (2006).

Therefore, although laser downlink methods are not subject to certain regulatory and safety complications associated with the use of a radio transmitter in space, the sophistication of laser instruments and the requirement for extremely precise spacecraft orientation make lasers inappropriate for applications with very small spacecraft. Further, a laser system cannot replace the functionality of a less directional radio downlink system, so the use of lasers cannot obviate the regulatory issues connected to authorization and use of space-based radio transmissions.

Accordingly, there is a need for a satellite downlink method providing a broad beam or non-directional signal, without requiring frequency assignment and coordination, and without posing a risk to terrestrial activity in the event of a satellite malfunction. Further, there is a need for an optical satellite downlink method that is functional without precise aiming of the spacecraft towards a ground station. In addition, there is a need for a satellite downlink method that does not require the inclusion of an attitude control system or an uplink radio receiver on the spacecraft, or if such subsystems are present, can safely provide downlink communications in the event of the failure affecting these subsystems.

BRIEF SUMMARY OF THE INVENTION

The present invention overcomes these and other drawbacks by providing methods and apparatus for optically transmitting a datastream from a satellite 50 to a ground station 60, using a light source with broad beam that does not need to be aimed at a ground station 60. Such a beam removes the need for precise attitude control of the satellite 50, and in some cases, eliminates the need for any attitude determination and control system on the satellite 50. This makes optical communication possible for extremely simple spacecraft where known optical downlink methods using collimated light, requiring a laser and precise attitude control, would be entirely infeasible. With a broad beam, the present invention enables simultaneous observation of the same optical downlink signal from widely separated positions on the Earth's surface, overcoming the risk of poor observing conditions at a single observing site. Further, the present invention enables satellite downlink without use of a radio transmitter on the satellite 50, thereby eliminating safety and regulatory issues connected with authorization and use of space-based radio transmissions.

The present invention may be used to transmit a low-bandwidth datastream through patterns induced on a source of uncollimated artificial light directed towards the Earth, or transmitted isotropically and received on Earth. A satellite 50 in low Earth orbit, when in eclipse 46 and not illuminated by sunlight, represents a low-bandwidth datastream through modulation of a source of uncollimated light, such as a set of light emitting diodes. Transmission modes include generating patterns in the color, intensity or polarization of a light source, or precise timing control of a strobe signal. A ground station 60 tracks the spacecraft in a telescope 62, slewing the telescope 62 to follow the spacecraft as it moves across the sky, recording light generated by the satellite 50 with a light sensor 64 such as a video camera. The datastream is regenerated through analysis of recorded video. Satellite downlink is initiated by detection of eclipse 46, by command via radio uplink, or in response to a periodic automatic timer. In an alternative embodiment, the satellite 50 represents the datastream through modulation of its effective albedo or reflective flux during periods of solar illumination.

In one aspect, the present invention comprises the steps of generating a data stream with a data generation system, and modulating an uncollimated light source on a satellite to represent this data stream, to provide optical downlink from a satellite. Further aspects of the present invention are described in the detailed description and alternative embodiments that follow. Accordingly, several objects and advantages of the present invention are:

a) to avoid the risk of radio interference with terrestrial radio systems from a malfunctioning spacecraft radio transmitter or control system, b) to eliminate the need for a communications receiver subsystem from spacecraft without an inherent need for remote control, c) to allow for optical downlink from a satellite without a narrow beam alignment between the transmitter and receiver, d) to allow for optical downlink from a satellite without a high-precision determination of the orientation of the spacecraft, e) to allow for optical downlink from a satellite without attitude control of the spacecraft, f) to allow for optical downlink from a satellite without prior knowledge of the ground station's physical location, g) to allow for the downlink of data from small spacecraft without use of limited radio frequency spectrum resources, h) to allow for the downlink of data from small spacecraft without obtaining frequency allocations for radio transmissions from space, i) to reduce risk associated with the rapid development and launch of new spacecraft, j) to provide a secondary communications downlink path, as a backup to a conventional downlink radio transmitter, Further objects and advantages will become apparent from a consideration of the drawings and ensuing description.

BRIEF DESCRIPTION OF THE SEVERAL VIEWS OF THE DRAWING

FIG. 5 is an illustration of a region of sky including the satellite, showing its apparent motion relative to background stars, according to a preferred embodiment of the invention.

FIG. 6 is an illustration of modulated patterns of uncollimated light conveying a data stream, in a preferred embodiment of the invention.

FIG. 12 is an illustration of the spectral characteristics of uncollimated light sources, according to a preferred embodiment of the invention.

REFERENCE NUMERALS

20 Satellite Face
22 Earth Sensor
24 Solar Cells
26 Face CPU
30 White LED Uncollimated Light Source
31 Spectral Characteristics of White LED
32 Red LED Uncollimated Light Source
33 Spectral Characteristics of Red LED
34 Green LED Uncollimated Light Source
35 Spectral Characteristics of Green LED
36 Blue LED Uncollimated Light Source
37 Spectral Characteristics of Blue LED
40 Orbit
42 Earth
44 Sun
46 Eclipse
48 Sub-Satellite Point
49 Stars
50 Satellite
52 Radio Uplink Receive Antenna
54 Data Bus
56 Main CPU
58 Sunlight Sensor Signal
60 Ground Station
62 Telescope
64 Light Sensor
66 Telescope Dome
68 Telescope Position Control
70 White Signal
72 Red Signal
74 Green Signal
76 Blue Signal
78 Calibration Level
80 Isotropic Radiation Pattern
81 Non-Isotropic Radiation Pattern Directed Towards Earth
82 Non-Isotropic Radiation Pattern Directed Towards the Sub-Satellite Point
83 Flash Timing Interval
84 Light Source Off
85 Basic Binary Mode
86 Multichannel Binary Mode
87 Analog Mode
88 Beacon Mode
90 Satellite in Sunlight Test
91 Create Data Packet
92 Extract Frame from Packet
93 Set Light Sources PWM
94 Test for More Data

DETAILED DESCRIPTION OF THE INVENTION

The present invention relates to satellite communications, specifically to the downlink of data through spacecraft modulation of an uncollimated light source observed at a ground station equipped with a tracking telescope and an imaging system.

Figure 1:
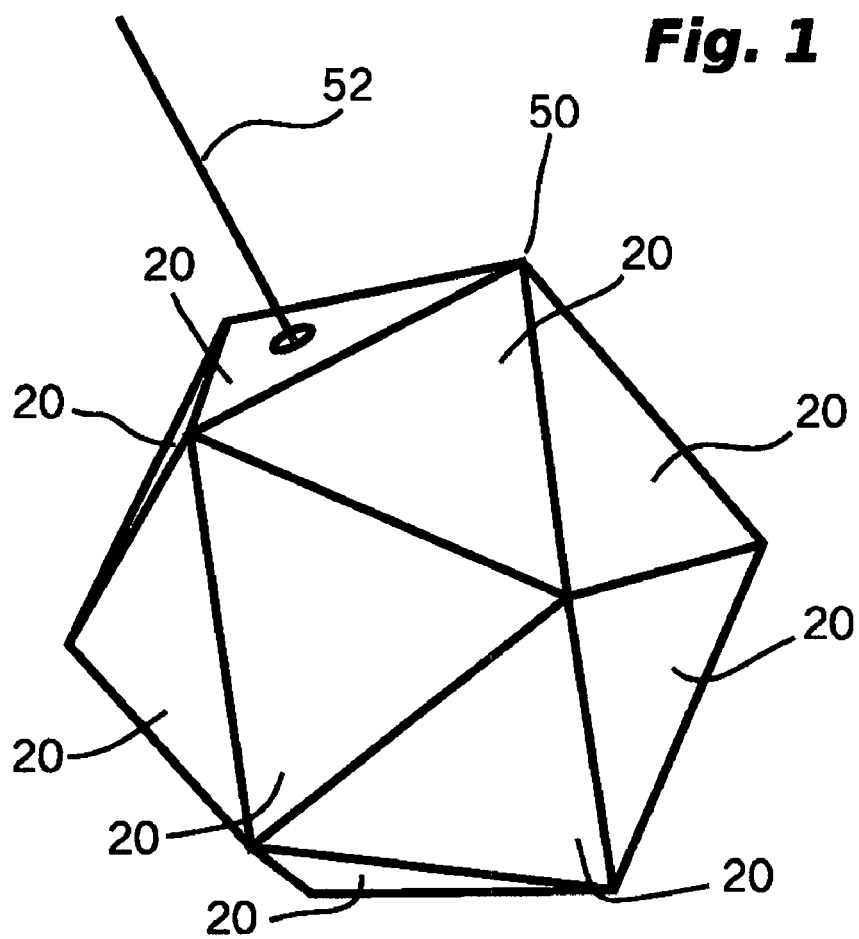
FIG. 1 is an illustration of the satellite structure, according to a preferred embodiment of the invention.

FIG. 1 shows an illustration of the structure of satellite 50, according to a preferred embodiment of the invention. Satellite 50 is preferably a regular Platonic solid, such as an icosahedron, with a standard package of equipment on each satellite face 20. The availability of similar equipment on each satellite face 20 on a regular Platonic solid, such as the twenty faces of an icosahedron, provides similar functionality regardless of spacecraft orientation. Extending from the icosahedron is radio uplink receive antenna 52, for reception of radio communications. The interior of the satellite structure includes other equipment typical for spacecraft operations, such as a power storage device, a control system including a microcontroller central processing unit, and an uplink radio receiver. Note that satellite 50 does not include a radio transmitter, although such equipment may be included by a spacecraft practicing the present invention. It is evident that satellite 50 could have other structural configurations, such as an extended shape enabling gravity gradient stabilization with two satellite faces 20 at each end of the satellite, or an arbitrary shape with attitude control to govern orientation of solar cells and other equipment.

Figure 2:
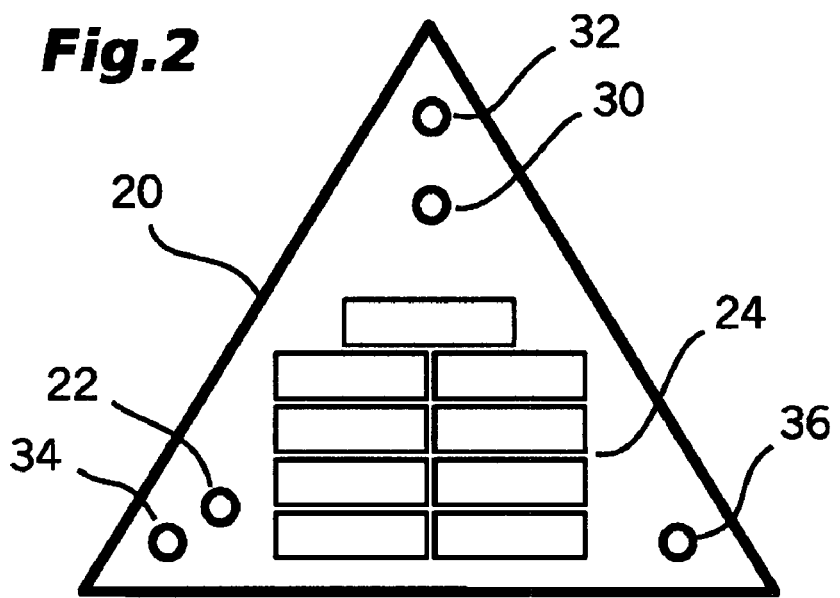
FIG. 2 is an illustration of a face of the satellite structure, according to a preferred embodiment of the invention.

FIG. 2 shows an illustration of a face of the satellite structure, according to a preferred embodiment of the invention. Each satellite face 20 includes solar cells 24 for power generation, an infrared photometer Earth sensor 22, and uncollimated light sources white LED 30 (light emitting diode), red LED 32, green LED 34, and blue LED 36. This set of four uncollimated light sources on each of the twenty satellite faces 20, comprising a total of 80 uncollimated light sources on satellite 50. In the preferred embodiment, the LED's may be HF5-W7590 (white), HF5-B5590 (blue), HF5-G5590 (green) and HF5-RS590 (red), all available from Super Bright LED's of St Louis Mo.

At times, a set of uncollimated light sources on one satellite face 20 may be treated as a single uncollimated light source, regardless of spectral characteristics. In this case, a plurality of uncollimated light sources comprises a plurality of light sources, where each source is a set with different radiation patterns relative to the frame of reference of the spacecraft. Similarly, at times, the set of all uncollimated light sources on satellite 50 with common spectral characteristics (e.g. all green LED's) may be treated as a single uncollimated light source, regardless of face. In this case, a plurality of uncollimated light sources comprises a plurality of light sources, where each source is a set with different spectral characteristics, each capable of generating an isotropic radiation pattern. More generally, an uncollimated light source is an apparent source of uncollimated optical illumination, radiating from satellite 50 and with properties, such as intensity or color, under the control of a data generation system for the purpose of downlinking data. It is evident that the number, type, spectral characteristics, and logical groupings of uncollimated light sources on the satellite may be varied within the scope of the present invention.

Figure 3:
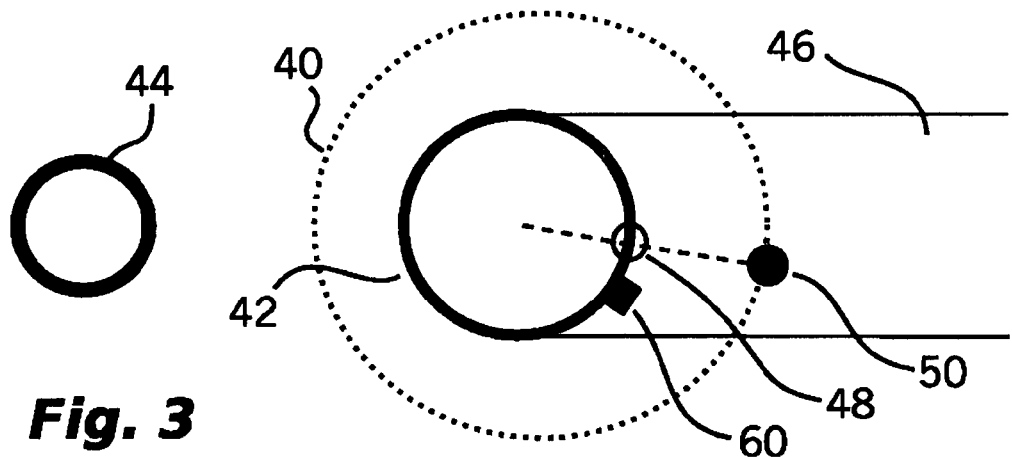
FIG. 3 is an illustration of the geometrical positions of Sun, Earth, region of eclipse, satellite, satellite orbit, ground station, and subsatellite point (SSP), according to a preferred embodiment of the invention.

FIG. 3 shows an illustration of the geometrical positions of Sun, Earth, region of eclipse, satellite, satellite orbit, ground station, and subsatellite point (SSP), according to a preferred embodiment of the invention. Satellite 50 is in satellite orbit 40 around Earth 42. The region is illuminated by Sun 44, with an eclipse 46 region where Earth 42 blocks sunlight radiated from Sun 44. In the illustration, satellite 50 is located in a region of eclipse 46. As satellite 50 orbits Earth 42 along satellite orbit 40, satellite 50 passes through both eclipse 46 and a region with direct solar illumination form Sun 44. The point on the surface of Earth 42 directly below satellite 50 is subsatellite point 48 (SSP), and for a satellite in non-geostationary orbit, subsatellite point 48 evidently moves relative to the surface of Earth 42 as satellite 50 moves along satellite orbit 40 and Earth 42 rotates about its axis. Ground station 60 is also located on the surface of Earth 42, within eclipse 46 (i.e. it is night at ground station 60), within line of sight to satellite 50, but not necessarily near subsatellite point 48. In the preferred embodiment, satellite orbit 40 is a near-circular low Earth orbit with an altitude of approximately 500 kilometers, but it is evident that satellite 50 may operate in a variety of orbits within the scope of the present invention.

Figure 4:
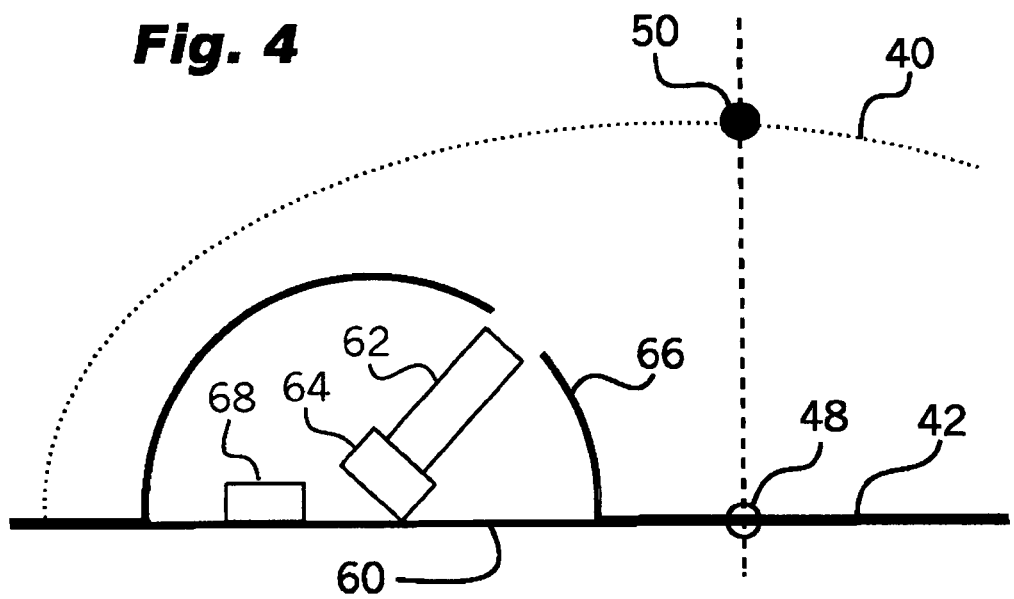
FIG. 4 is an illustration of ground station equipment, including a telescope, according to a preferred embodiment of the invention.

FIG. 4 shows an illustration of ground station equipment, including a telescope, according to a preferred embodiment of the invention. Ground station 60, located on Earth 42, includes telescope 62 housed within telescope dome 66, connected to telescope aiming system 68 for aiming telescope 62 in a selected direction, in this case towards satellite 50 following satellite orbit 40 and illustrated within line of sight of telescope 62. At the focal plane of telescope 62, light sensor 64 detects an image of light collected and focused by telescope 62 from the selected region of sky including satellite 50, and a series of images are recorded with light sensor 64 while satellite 50 is within line of sight. Light sensor 64 may be, for example, a video recorder, charged coupled device, or photometer. It is preferred that the integration time of light sensor 64 be relatively long, for example between 1 millisecond and 100 milliseconds, to allow for the detection of faint illumination from satellite 50.

FIG. 5 shows an illustration of a region of sky including the satellite, showing its apparent motion relative to background stars, according to a preferred embodiment of the invention. This illustration is representative of the images that may be recorded with light sensor 64 through telescope 62 when recording a datastream from satellite 50. Background stars 49 are visible in the field of light sensor 64, along with satellite 50. As satellite 50 follows the path of satellite orbit 40, the apparent position of satellite 50 moves relative to background stars 49. It is preferred that telescope position control 68 be used to follow satellite 50 with telescope 62, so that satellite 50 remains in the field of view of light sensor 64.

FIG. 6 shows an illustration of modulated patterns of uncollimated light conveying a data stream, in a preferred embodiment of the invention. The sources of uncollimated light on satellite 50 are divided into a plurality of uncollimated light sources according to spectral characteristics. In an exemplary embodiment, there are four such groups, comprising groups of white, red, green and blue LED's. For each group, main CPU 56 generates a modulation pattern representing all or a portion of the data stream, e.g. white signal 70, red signal 72, green signal 74 and blue signal 76. These modulation patterns are reproduced through some or all of the uncollimated light sources with corresponding spectral characteristics. During this period, a sunlight sensor signal 58 is monitored by microcontroller 56, to distinguish between periods when the satellite is in eclipse 46 and when the satellite is in direct solar illumination, in view of sun 44.

While in sunlight, microcontroller 56 selects mode 84 and the light sources are deactivated. Upon detection of the loss of sunlight, indicated by a drop in the value of the sunlight sensor signal 58, the light sources are activated. Main CPU 56 can select among a variety of modes, and a series of representative modes are illustrated. In basic binary mode 85, binary data is transmitted through all uncollimated light sources in unison, with each source switched between no radiance and full radiance in correspondence with binary symbolic values. In multichannel binary mode 86, multichannel binary data is transmitted through a plurality of uncollimated light sources with distinct spectral characteristics, each source switched between no radiance and full radiance in correspondence with binary symbolic values. In analog mode 87, one distinctive light source (in this case, white signal 70) is held at a constant calibration level 78, typically full radiance, while other light sources are set to fractional radiance levels in corresponence with analog or multibit symbolic values. In beacon mode 88, all but a minimal set of light sources are deactivated, and the remaining light sources are kept mostly off, except for an occasional pulse of radiance. The period between pulses, flash timing interval 83, may be predetermined, or may be selected in correspondence to one, or a series of, data values. This sequence of modes is exemplary, and other sequences, combinations, and triggering conditions are envisioned within the scope of the present invention.

Figure 7:
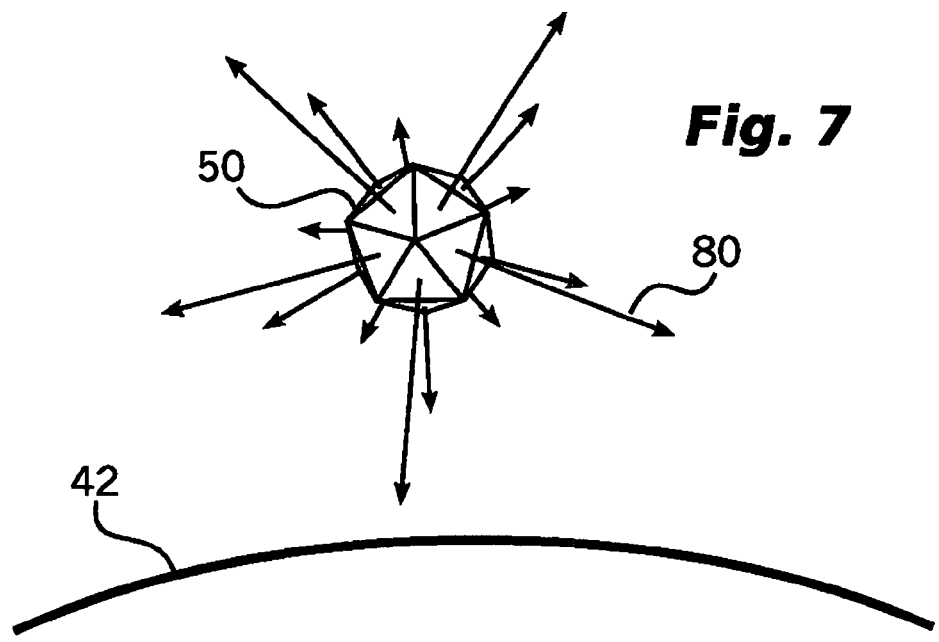
FIG. 7 is an illustration of an isotropic radiation pattern of uncollimated light conveying a data stream, in a preferred embodiment of the invention.

FIG. 7 shows an illustration of an isotropic radiation pattern of uncollimated light conveying a data stream, in a preferred embodiment of the invention. The satellite 50 radiates uncollimated light each satellite face 20, generating an isotropic radiation pattern 80 that illuminates all directions, including Earth 42.

Figure 8:
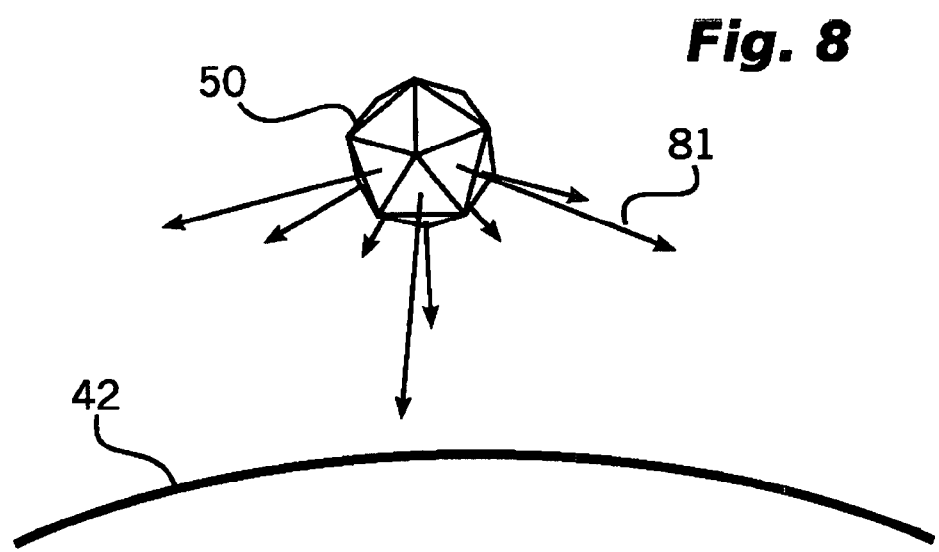
FIG. 8 is an illustration of a non-isotropic radiation pattern of uncollimated light conveying a data stream, directed towards Earth, in a preferred embodiment of the invention.

FIG. 8 is an illustration of a non-isotropic radiation pattern of uncollimated light conveying a data stream, directed towards Earth, in a preferred embodiment of the invention. The satellite 50 detects Earth 42, and selectively activates light sources on satellite faces 20 believed to be facing Earth 42, generating a non-isotropic radiation pattern 81 that illuminates Earth 42 while not illuminating directions away from Earth 42.

Figure 9:
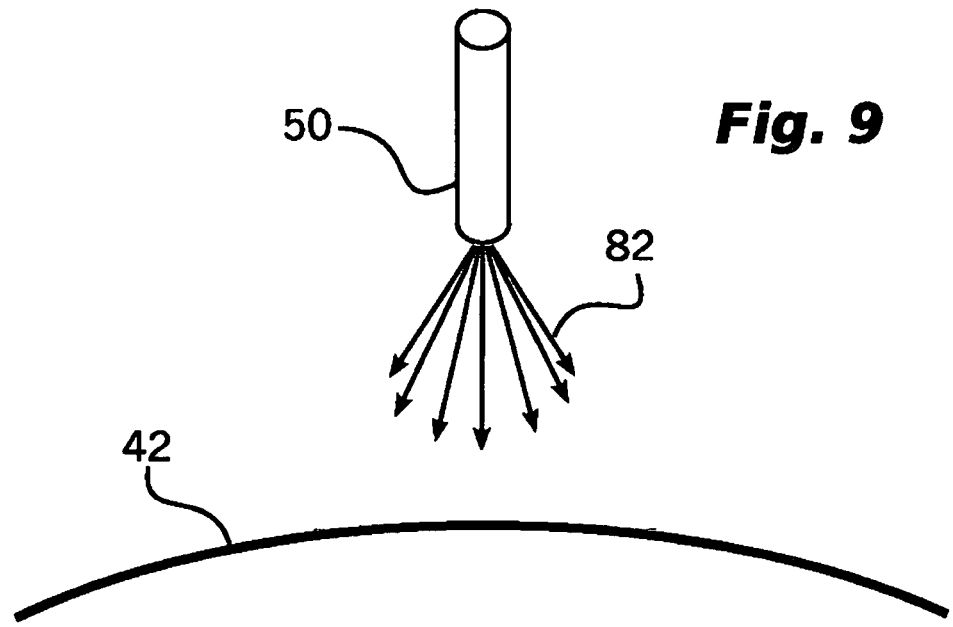
FIG. 9 is an illustration of a non-isotropic radiation pattern of uncollimated light conveying a data stream, directed to the sub-satellite point from a satellite using gravity-gradient stabilization, in an alternative embodiment of the invention.

FIG. 9 is an illustration of a non-isotropic radiation pattern of uncollimated light conveying a data stream, directed to the sub-satellite point from a satellite using gravity-gradient stabilization, in an alternative embodiment of the invention. Satellite 50 is shaped with a long axis, which due to tidal forces will naturally align to point at the Earth 42 and sub-satellite point 48. It is not determined which end of satellite 50 will point towards Earth 42, and which end will point in the opposite direction. Both of these satellite faces 20 are equipped with light sources, and the face oriented towards Earth 42 is activated to generate a non-isotropic radiation pattern 82 directed towards Earth 42, and in particular the sub-satellite point 48. As satellite 50 moves along satellite orbit 40, the subsatellite point 48 will move across the surface of the Earth 42, painting much of the surface at various times. When the beam passes over a ground station 60, the ground station 60 can observe light from satellite 50 and record the datastream.

Figure 10:
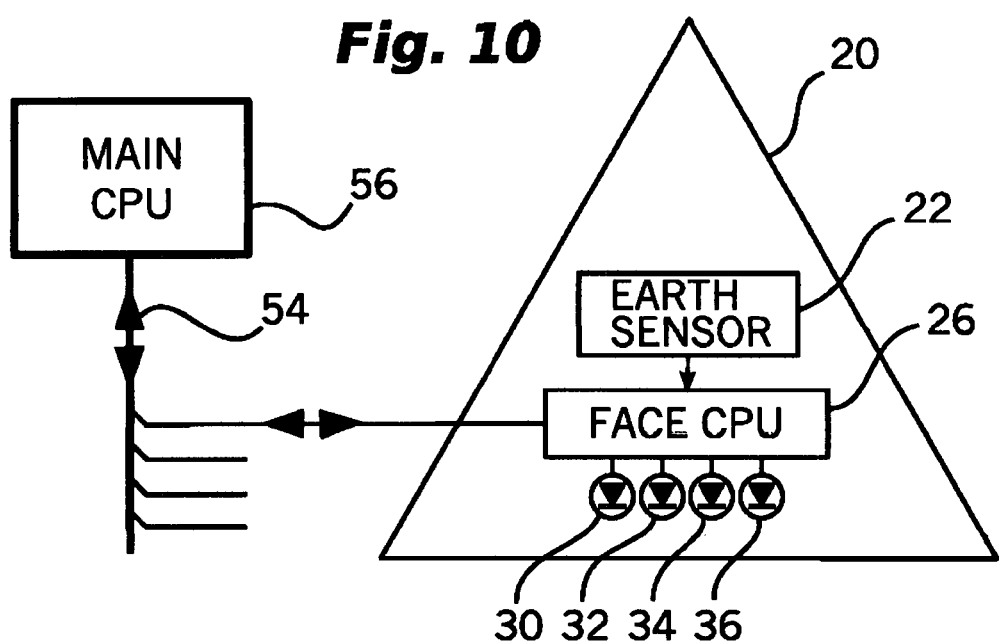
FIG. 10 is a schematic of the spacecraft electrical system, in a preferred embodiment of the invention.

FIG. 10 shows a schematic of the spacecraft electrical system, in a preferred embodiment of the invention. A main CPU 56 (central processing unit) serves as a central control system and data generation system for satellite 50. Main CPU 56 is connected through data bus 54 to a face CPU 26 on each of the satellite faces 20. Considering a representative satellite face 20, the face CPU 26 generates output lines to uncollimated light sources on that face, for example white LED 30, red LED 32, green LED 34, and blue LED 36. Data from Earth sensor 22, which may be an infrared photometer or other radiation detector sensitive to emissions from Earth, generates a signal connected to an analog input on face CPU 26. In addition, face CPU 26 may monitor or govern the operation of solar cells 24 on this satellite face 20.

Data bus 54 includes lines operating by a protocol allowing for the conveyance of instructions from main CPU 56 to the face CPUs 26 addressed collectively or by individual satellite face 20. Such instructions may activate or deactivate individual sources of uncollimated light, for example, allowing deactivation of light sources on satellite faces 20 that are not oriented towards Earth 42, or allowing deactivation of light sources with specific spectral characteristics, or allowing a different combination of spectral characteristics on different satellite faces 20 to allow for ground determination of the orientation of satellite 50. Representative modes may include 'all satellite faces activated', 'all satellite faces deactivated', 'all satellite faces activated upon passage of local Earth sensor threshold test', etc. In a typical application, main CPU 56 commands deactivation of all light sources when solar illumination is present, and also during a portion of the eclipse period to accommodate power budget limitations, and commands activation of all light sources during a portion of the eclipse period, but in a mode where face CPUs 26 locally deactivate all light sources on a particular satellite face 20 if the Earth sensor 22 on that face does not indicate that the face is oriented towards Earth 42.

Data bus 54 includes a set of lines, or bitfields within command types, from main CPU 56 dedicated to each group of uncollimated light sources with common spectral characteristics, e.g. white, red, green and blue signal lines. These lines are preferably pulse width modulated, to allow for efficient generation of fractional intensity radiative flux from satellite 50, but these lines may evidently be standard digital lines, or dedicated analog lines. face CPU 26, based on the current mode of operation, may turn light sources on or off. This may be implemented in many ways, with variations in mode and logic to accomplish particular objectives. In a typical mode, face CPU 26 reads commands over data bus 54 regarding system wide light state, giving the general on/off state for each radiative color. This information is masked to 'off' if the local Earth sensor 42 does not indicate the presence of Earth in view of this satellite face 20, unless main CPU 56 has issued a command setting an isotropic radiation pattern 80 that overrides this Earth sensor application. In this way, lights are only activated that face Earth 42, preventing waste of power through radiation away from Earth, while still providing broad optical downlink to much or all of the surface of Earth 42 within line of sight to satellite 50. Data bus 54 may also be used to relay information from satellite face 20 to main CPU 56.

Figure 11:
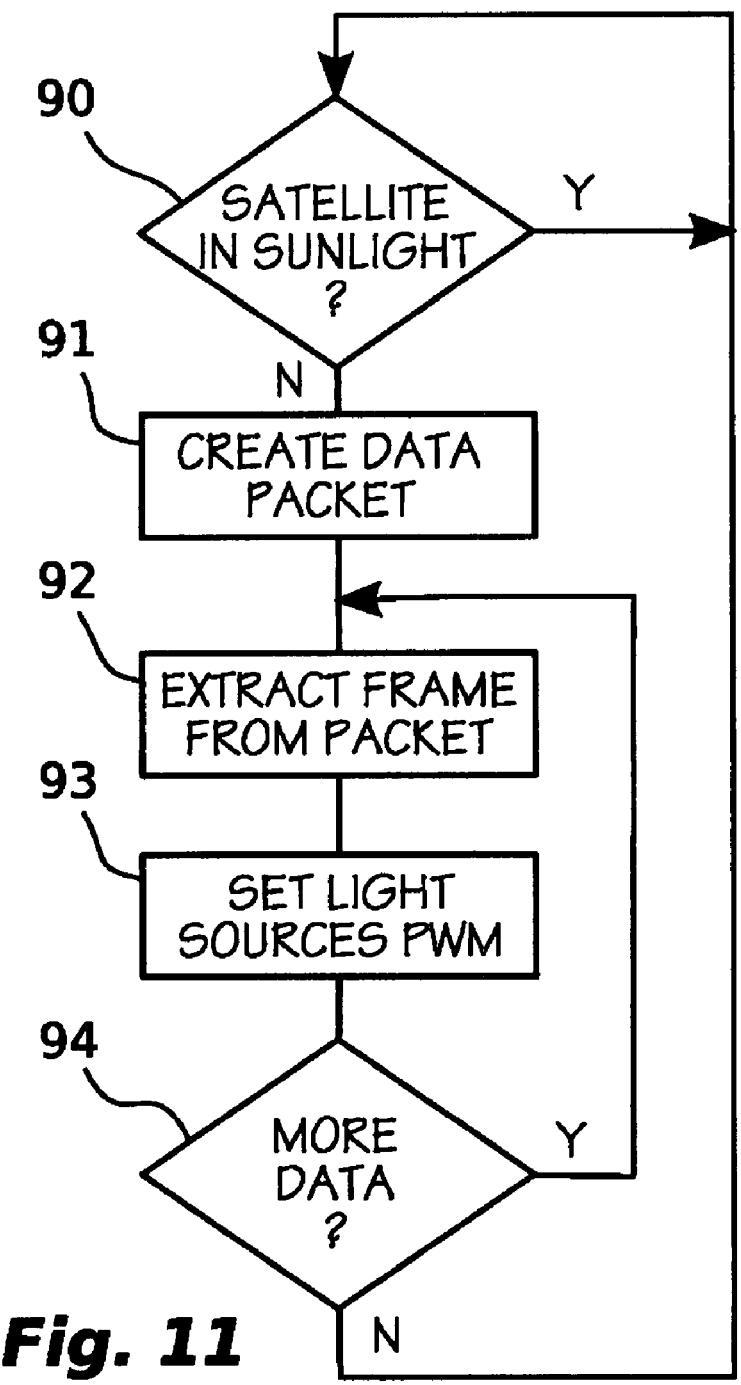
FIG. 11 is a flowchart of the operation of the satellite control system, in a preferred embodiment of the invention.

FIG. 11 shows a flowchart of the operation of the satellite control system, in a preferred embodiment of the invention. Main CPU 56 conducts satellite in sunlight test 90, for example by monitoring power generation levels from solar cells 24, monitoring photometer readings, consulting an orbital ephemeris, or similar means. If satellite in sunlight test 90 indicates that satellite 50 is not in eclipse 46, then the process reverts to step 90, thereby waiting for the loss of solar illumination to trigger activation and modulation of the optical downlink. If satellite in sunlight test 90 indicates that satellite 50 is in eclipse 46, at step 91, main CPU 56 creates a data packet. This may include, for example, engineering or science sensor data, computed information such as satellite 50 rotation rate, or other information. At step 92, main CPU 18 extracts a data frame from the data packet, corresponding to a portion of data that can be conveyed in parallel over the optical downlink, for instance through fractional luminous flux on an uncollimated light source, or separate settings of distinct uncollimated light sources. In a basic example, if downlink is achieved through on/off setting of a single color LED, a frame may be a single data bit. If downlink is through on/off settings of N LED's, then a frame may be N bits. If downlink is through a fractional setting with N steps, then a frame may be log (base 2) N bits. One approach for increasing the downlink data rate is to include a larger number of distinct colors. Other combinations and frame definitions are evident from consideration of these examples. At step 93, control information is transmitted on data bus 54 to configure uncollimated light sources to an activated condition with luminous flux state that conveys the frame data. This state is held for a duration at least equal to the anticipated integration time for light sensor 64, and preferably at least twice this minimum duration. Then, at step 94, main CPU 56 tests to see if more data is present in the data packet. If so, the process returns to step 92, to continue transmitting data through the optical downlink until the entire frame is conveyed. If not, the process may revert to step 90. If continuous downlink during eclipse 46 is not desired, for example to maintain a power budget, then a delay may be introduced prior to reverting to step 90. During such a delay, microcontroller 56 may monitor a radio uplink receiver, and resume optical downlink upon receipt of an uplinked command to initiate a downlink session.

FIG. 12 shows an illustration of the spectral characteristics of uncollimated light sources, according to a preferred embodiment of the invention. For each of the LED types on each spacecraft face 20, a typical spectral distribution is shown. Properties of white LED 30 are shown in the spectral characteristics of white LED 31, properties of red LED 32 are shown in the spectral characteristics of red LED 33, properties of green LED 34 are shown in the spectral characteristics of green LED 35, and properties of blue LED 36 are shown in the spectral characteristics of blue LED 37.

OPERATION OF THE INVENTION

The present invention may be used by a satellite 50 to transmit data (downlink) to a ground station 60. An artificial uncollimated light source is generated on a satellite 50, during a period when the satellite 50 is in eclipse 46, so illumination from this light source is not swamped by more intense reflections of sunlight from the spacecraft structure. The light source is detected from Earth 42 through a telescope 62 configured to track the spacecraft's position and motion in the sky, and an image through the telescope is captured and recorded with a light sensor 64, such as video equipment. Modulation of the light source on the satellite 50 allows for the optical transmission of data to the ground station 60.

A main CPU 56, such as PIC microcontroller from Microchip Inc of Chandler AZ, is used as the spacecraft control system. In some configurations, it is desirable to utilize more than one interconnected microcontroller device, to obtain more data port and hardware interface elements, or reduce wiring between spacecraft elements. For example, in the preferred embodiment, each satellite face 20 is equipped with a face CPU 26 connected to the main CPU 56 through a data bus 54, to provide local connections to various components on satellite face 20.

The light source is a series of light emitting diodes (LED's) positioned around the spacecraft frame in a pattern that enables the transmission of light in all directions with equal intensity (isotropic radiation pattern 80). In an exemplary selection of LED components, the LED's have a light output of 7500 mcd (white) or 5500 mcd (other colors), with a half-intensity viewing angle of 90 degrees. It is advantageous that the LED beam width exceed the angular separation between LED's on the spacecraft surface, or to use clusters of LED's constructed to collectively illuminate a similar region, to provide the capacity for radiation in all directions. The control system can independently command LED's, individually or in groups, to bias the radiation pattern from isotropic, either to take advantage of a known directionality of possible ground stations, or to cycle radiation between different directions to reduce the system power load.

The control system generates four primary light system control lines, one associated with each LED color. Each primary light control line is connected to a microcontroller pulse width modulation (PWM) output line, and the microcontroller can adjust the intensity of the light source between off and full brightness by selecting an appropriate PWM parameter. For example, in the preferred embodiment, these lines carry white signal 70, red signal 72, green signal 74, and blue signal 76. Each LED is connected to the primary light control line for its color, usually through a current limiting resistor. The light control lines may be relayed via data bus 54 to each satellite face 20. An enable mask in face CPU 26 may be addressed by main CPU 56, to enable or disable individual LED elements by color and/or face, supporting non-isotropic radiation patterns.

The power subsystem of satellite 50 includes solar cells 24 distributed around the spacecraft structure on the satellite faces 20, and a power storage device to retain charge at least temporarily after satellite 50 entry into eclipse 46. For example, the power storage device may be a battery or a supercapacitor. During the daylight portion of a satellite orbit 40, the solar cells 24 charge the power storage device. The main CPU 56 monitors for the loss of power generation from the solar cells 24, indicating entry into the Earth's shadow (eclipse 46). The main CPU 56 then governs the discharge of the capacitor through the light source, switching the LED's on and off in a pattern representing data, in accordance with a rotation between data modes and radiation patterns as described below. The data packet assembled by main CPU 56 may include engineering data, such as performance measurements of the solar cells 24, attitude and rotation information determined from differential comparison of illumination by location and time, and data from other sensors.

If sufficient power is available, the pattern may be repeated, probably after a delay of several minutes so that the spacecraft is illuminating a different portion of the Earth's surface. However, it is not necessary for the pattern to be transmitted more than once per capacitor charge, and to minimize the number of solar cells 24 it may be advantageous to design for only a single downlink activation period per satellite orbit 40.

Analog inputs on the face CPUs 26 are connected to Earth sensors 22, for detecting the direction of infrared radiation during nighttime periods, and when in a non-isotropic radiation pattern 81 mode this information is used to preferentially activate LED's on the side of the spacecraft facing Earth 42. Other analog inputs to the face CPU 26 are connected to the power generation system to monitor solar cell 24 output levels. The microcontrollers may also monitor power storage system supply levels, other engineering data, and a regulated voltage reference level to allow for calibration of other analog readings.

A radio receiver on satellite 50 is connected to a radio uplink receive antenna 52, and the main CPU 56, to indicate the presence of carrier signal on a selected uplink frequency optionally with screening for presence of a PL tone or DCS, or to pass demodulated data from a receiver data reception module. Benefits of uplink capacity include the capacity to trigger a downlink sequence when the satellite 50 is in view of a ground station 60, and updating microcontroller firmware with new software developed during the mission.

In the preferred embodiment, satellite 50 has no downlink radio transmitter, a historically unusual configuration for a spacecraft. The present invention is also useful on a satellite that includes a conventional downlink radio transmitter, where the uncollimated light source provides redundancy in the event of a failure in the radio transmitter system, and provides a beacon downlink capacity for general diagnostic and recovery operations.

Note that such a satellite 50 would be operational and functional without any radio equipment, for either uplink or downlink, and no capacity for remote command and control through ground station uplink of any kind. Such a minimal spacecraft would operate permanently on a single set of commands installed in the microcontroller firmware before launch. While it may be beneficial to provide uplink capacity, and this is included in the preferred embodiment to allow for triggering of data transmission while the satellite 50 is optimally positioned relative to a ground station 60, the present invention allows for the omission of a radio transmitter on the satellite 50.

BACKGROUND ON SATELLITE COMMUNICATIONS AND VISUAL DETECTION

Spacecraft can be divided into two general categories. Most satellites are "active spacecraft", collecting data and transmitting information to Earth for analysis. "Passive spacecraft" are passive targets with known properties observed by ground-based sensors, typically for calibrating sensor response, or for studying forces that influence orbital properties (e.g. atmospheric drag or solar radiation pressure) through repeated orbital measurements. Active spacecraft include a communications subsystem for transmitting data to ground stations on Earth ("downlink"), and receiving control commands from ground stations on Earth ("uplink"). Some spacecraft support inter-satellite communications channels, where a direct communications link is established with another spacecraft. Downlinked data may be of widely different types. At one extreme, the primary function of some satellites is downlink of high-bandwidth content, such as television signals. At another extreme, a satellite downlink may be a minimal "beacon" engineering telemetry signal, providing a low-bandwidth report of selected technical conditions on the spacecraft.

Radio is the conventional method for satellite communications, and a typical spacecraft communications subsystem includes a radio transmitter and a radio receiver, operating in sections of the radio frequency spectrum reserved for satellite operations. As a supplement to conventional radio operations, some satellites use laser as a carrier for high-bandwidth data transmission, or capsule return for the delivery of physical samples. These three methods—radio transmission, laser transmission, or physical return—are the three primary methods for sending information from space to Earth.

All spacecraft near Earth can be detected with ground-based sensors, through visual or radar tracking. This is, for example, how non-operational space debris in near-Earth orbit is detected, tracked and catalogued. Passive spacecraft operate on the same principle. Visual tracking is based on the fact that objects in space are frequently in direct sunlight while it is nighttime at locations within line-of-sight on the Earth below. At these times, sunlight falling on the spacecraft is reflected to the Earth, and may be detected using a ground-based optical sensor. This is the same principle by which the Moon and planets are visible in the night sky reflected sunlight. In practice, some satellites (such as the International Space Station) can become brighter in the night sky than even the brightest stars. Many operational satellites in near-Earth orbit have a brightness comparable to the fainter stars visible from a dark location, and are easily detected in binoculars or telescopes. Satellites in near-Earth orbit move rapidly across the sky, especially when observed through a telescopic sensor, but tracking systems have been developed that accurately move a telescope to track a spacecraft and maintain continuous visual observation while the satellite is in the portion of its orbit near enough to the ground station to allow observation.

Conventional visual satellite observation is based on the detection of reflected sunlight. This is useful for measuring the orbit of the satellite, determining its rate of rotation, estimating physical properties such as size and surface composition, and (for large objects, such as the space shuttle) taking photographs that show the shape and physical condition of the spacecraft. This is sufficient for the utilization of passive satellites, and even "space junk" is often used as passive probes (e.g. studying the effect of the Earth's magnetic field on the object's rotation). Some passive satellites, such as EGP/Ajisai and LAGEOS, carry reflectors fixed to the satellite structure that relay sunlight or ground-based lasers to a ground station detector. Taking advantage of solar illumination, there have been proposals for large inflatable "space billboard" structures, so large that they would present a distinctive shape to a visual observer on Earth, probably in the shape of a marketing logo.

In all these cases, light is passively reflected from the satellite, and there is no data generation system on the satellite either creating or actively relaying a datastream imprinted on the light source. Evidently, in such examples, there is no downlink and recording of a data stream originating from the satellite, or actively relayed by the satellite. Further, there have been proposals for satellites that reflect sunlight to populated regions at night, especially near the Arctic Circle, for night-time illumination. Although the reflectance of solar illumination from such a satellite would be under active control, this reflectance is the function of the satellite, and does not convey a data stream generated by the satellite.

On extremely rare occasions, artificial lighting on a spacecraft has been detected from Earth. For example, floodlights illuminating the payload bay of the Space Shuttle have been observed by amateur astronomers who specialize in the visual observation of satellites. However, artificial lights are much fainter than sunlight, and artificial illumination from spacecraft is both rare and difficult to detect, due to its faintness as seen from Earth. In other cases, satellites have carried light sources for local operations. For example, the GENESIS-II spacecraft carries an external projection system for painting advertising images onto a portion of the spacecraft structure, with the view captured by a camera on the spacecraft, and the images relayed to Earth through a traditional radio downlink. Such a projection system is evidently not useful for directly downlinking a data stream to Earth, and is not designed for detection of the light source from Earth. For visibility from Earth, space billboard concepts have not used artificial lighting, but have proposed reflecting sunlight from sheets sufficiently large to create a visible surface area to the unaided eye. Note that even the largest spacecraft ever launched have appeared starlike to the unaided eye, so the surface area of an Earth-oriented advertising panel must be extremely large, for example a square kilometer mylar sheet imprinted with a fixed advertising design.

Apparent Brightness of Light Source

The apparent brightness of an artificial light on a satellite 50, as seen from Earth 42, depends on the intensity of the light source and the distance from the satellite 50 to the ground station 60. If the light source is non-isotropic (directional), the apparent brightness will also depend on the degree of directionality, and the angle (as seen from the satellite 50) between the ground station 60 and the peak direction of illumination, possibly the sub-satellite point 48.

In astronomy, the standard measure of apparent brightness is called "magnitudes". This is a logarithmic scale where larger numbers equate to fainter objects. To illustrate, here are some approximate magnitudes: Sun −27, Moon −12, the brightest planet (Venus) −4, the North Star +2, the faintest stars visible to the unaided eye +6, Pluto +14.

Suppose a satellite 50 generates an isotropic radiation pattern 80 with a total light output of L lumens, and the satellite 50 is within line-of-sight visibility from a ground station 60 at a range of R meters. As a starting point, we may set R equal to the perigee altitude of the satellite orbit 40, since this is the range of the satellite 50 under optimal conditions. The satellite 50 is illuminating a sphere with radius R, with a total surface area of $4*pi*R^2$. The satellite's total light output is distributed evenly across this sphere. Therefore, the intensity of the satellite's light, from the perspective of the ground station 60, equals $((1/(4*pi))*(L/R^2))$ lumens per square meter (this unit is commonly called "lux"). Astronomical magnitude is a logarithmic scale where a difference of 5 magnitudes corresponds to a flux ratio of 100, so the flux ratio for a difference of one magnitude is $100^{(1/5)}$. Therefore, the difference in magnitude between two objects is given by $(100^{(1/5)})*LOG(A/B)$, where A and B represent the light flux of two objects being compared. For a reference, we choose the Sun 44. The peak flux of sunlight on Earth 42 is approximately 130,000 lux, and this corresponds to magnitude −26.7. Therefore, the apparent magnitude M of an isotropic artificial light on a satellite 50 is given by $$M=-26.7+2.51*(6.213-LOG(L/R^2))$$

The intensity of non-isotropic light sources are sometimes quoted in terms of the effective isotropic radiation, from the perspective of an observer in the region of maximum illumination, if the source radiated at this intensity in all directions.

Therefore, in a practical sense, an estimation of the desired effective isotropic radiation is a good starting point for light source design requirements, even if the design will feature directional light sources that are actively aimed, passively aimed or dynamically selected by a spacecraft control system.

In the preferred embodiment, when generating an isotropic radiation pattern 80, the satellite 50 uses twenty satellite faces 20, each with four LED's each with a combined light output of 44 lumens, for a total light output of 880 lumens. Since the total generated light is a composite from plural discrete sources having individually non-isotropic radiation patterns, the total generated light is not perfectly isotropic, but variations between directional minima and maxima are small and mostly irrelevant. Note that the angle between satellite faces 20, and hence the angle between peak radiation from adjacent light sources within the same radiation pattern set, is significantly smaller than the half-intensity viewing angle of the LED's. This helps ensure a relatively smooth effective radiation pattern that is nearly isotropic. Using the equation for computing apparent magnitude, assuming a satellite 50 range of 500 kilometers, shows that the spacecraft magnitude is +10. To conserve power, the light source may operate with a reduced intensity, or LED's of certain colors may be deactivated, while still retaining enough apparent brightness to allow datastream capture from a ground station 60.

Existing techniques for ground-based satellite tracking can detect satellites, shining by reflected sunlight, as faint as magnitude +13 using a video system capturing sixty frames per second. Higher frame rates are practical for brighter objects. It is expected that improvement in light sensor 64 technology will generally allow for higher frame rates in the future, even for fainter light sources. An artificial light source on a satellite 50, configured to shine brightly enough to be detectable from a ground station 60, can be similarly tracked and captured on video. Variations in the brightness of this artificial illumination, such as a simple on/off flash pattern, would be captured on the video system. Such variations can be deliberately generated to convey data, and in this manner, data may be transmitted to a ground station 60 through the use of an uncollimated light source.

When the satellite 50 is in daylight, for a ground based observer of the satellite 50, the intensity of reflected sunlight from the satellite 50 will usually overwhelm the intensity of artificial light generated on the satellite 50. For this reason, this method of downlink is most practical when the satellite 50 is in eclipse 46 (in the shadow of Earth 42, and therefore not illuminated by the sun 44).

Data Transmission

In a basic binary mode 85 in the preferred embodiment, data is encoded as a simple binary on/off pattern of the light source with time. A light sensor 64 at ground station 60 records the intensity of light at the spacecraft's position as a function of time, and this is used to regenerate the datastream. With a video system capable of recording at sixty frames per second, and presuming data levels are maintained for two frames (since the temporal alignment of binary transitions on the satellite 50 and frame transitions on the ground light sensor 64 are undefined, and this ensures a full frame at each transmission state), this makes possible a data rate of 15 bits per second.

Compared to traditional radio communications systems, this exemplary mode of the preferred embodiment transmits an extraordinarily small quantity of data. Assuming a 15-second transmission session, a representative downlink package might hold only 225 bits. This is, however, quite sufficient for many purposes. Examples include verification that a spacecraft is still actively powered with a functional control system, return of basic engineering data describing conditions on the spacecraft, evaluation of thermal or attitude performance of spacecraft prototype configurations, long-duration testing of the performance and reliability of components that have not been qualified for use in critical spacecraft functions, and measurement of transient events such as space debris or micrometeoroid impacts. Larger quantities of data, although still small compared to traditional communications methods, may be downlinked in longer communications sessions, or with the use of faster video capture equipment.

To increase the effective datarate, additional information may be encoded through spectral, polarization or intensity control of the light source. For example, when the light sources are made from LED's of multiple colors, or LED's with the capacity of generating multiple colors depending on the direction of current flow, the control system has more than two states available per time interval. For example, the states might be 'off', 'red' or 'green'. If the light sensor 64 is differentially responsive to spectral conditions, either through direct color detection or physical divergence of light by frequency, then these states can be discriminated and the datastream regenerated. This type of separation is possible even if the light sources are not spectrally discontinuous, so long as the signatures are spectrally distinct. In the preferred embodiment, the light source elements include white, red, green and blue. Astronomical techniques are known to separate these sources and independently measure the intensity of each source, even including white, where the spectral emission overlaps the peak intensity spectral regions of other sources.

The light source may be given any of several discrete intensities (e.g. off, half intensity, or full intensity) if the sensor can discriminate these intensities, and the light source has sufficient radiance at its lowest setting to be detectable at the ground station 60. More generally, analog intensity variation may be used to transmit analog parameters, with an error bar in measurement that depends on ground station performance.

When transmitting data in a format that depends on the fractional intensity of the light source, it is beneficial for the satellite 50 to include a calibration level 78 light in a known color, sending light at a constant intensity during the transmission session in an analog mode 87. In the data reduction, the intensity of each source can be independently determined for each frame, and variations in apparent intensity of the calibration source used to scale the apparent intensity of the fractional-intensity data signals. This allows for correction of errors induced by variations in the effective light transmission, such as fluctuating atmospheric conditions, differences in the portion of atmosphere encountered as the satellite 50 position changes against the background stars 49, and radiative pattern variations related to the changing viewing angle or orientation of the satellite 50.

Since the atmosphere is transparent at visual wavelengths, ordinary visible light sources are appropriate for data downlink from satellite 50. However, infrared, near infrared or ultraviolet light sources may also be used, in spectral bands that are passed through the atmosphere.

The use of color to actively encode data is potentially undesirable because of a restriction to multiple or multicolor LED's, and (for multiple LED's) the additional mass for including multiple LED's and associated hardware and electronics in each direction of radiance for each selectable color. If color is not used for this purpose, color may alternatively be used to return attitude information from the spacecraft. For example, radiance in most directions might be red, but radiance in selected directions green, so that the color of the spacecraft illumination may be used to determine the orientation of satellite 50 from ground station 60 without an onboard attitude determination system.

In most applications, it is desirable to use some of the data downlink capacity for verification bits, to allow for validation of received data. Such verification bits may include parity, CRC, or similar error-detecting or error-correction patterns. Alternatively, data can be transmitted multiple times, allowing for a comparison between data repetitions if more than one cycle is captured. Repetition has the benefit of allowing for recovery from transient problems such as the satellite passing behind a cloud, glitches in tracking of the satellite causing it to briefly exit the field of view, etc. Parity or CRC algorithms have the benefit of compressing error detection into a smaller number of bits, allowing for more total downlink capacity.

Datastream Representation and Modes

The spacecraft control system, such as main CPU 56, generates a datastream of information to convey to a ground station 60, formatted as a series of discrete states, and sequentially commands the light source to a series of conditions representing each state in this series. In the preferred embodiment, the satellite 50 may between several downlink modes:

Beacon Mode 88: The light source is pulsed at regular intervals, for example once per second, with a duration similar to 1× or 2× the expected frame rate of the ground station light sensor 64. This allows for ground station 60 detection of the satellite 50, in a spacecraft mode that requires relatively little power per minute of operation, since the duty cycle is low. This mode is useful for calibrating ground station 60 equipment, confirming the capacity of this equipment to acquire the satellite 50, and indicating the health of the satellite 50. If the satellite 50 does not have sufficient power storage or generation capacity for active data downlink in a more sophisticated mode during the entire eclipse 46 period on each satellite orbit 40, the low power requirements of this beacon mode 88 mode may make it useful as a background state. In an alternative, if there is sufficient power to support a higher duty cycle, the duration of flashes may be extended to make spacecraft detection easier.

Basic Binary Mode 85: In this mode, data is formatted as a binary sequence, where '1' corresponds to 'light on', and '0' corresponds to light off. The spacecraft control system commands the light source to generate a flashing pattern corresponding to the binary data representing information to convey to a ground station. Each state is maintained for a duration at least 1× or 2× the expected frame rate of the ground station detector. In the preferred embodiment, all light source elements are used for this purpose in unison, but any color element, or combination of color elements, may be used. An advantage to using all elements together is that the resulting light pattern will have the maximum radiative flux, and therefore be most easily detectable.

Multichannel Binary Mode 86: When N independently controllable colors are available at the spacecraft light source, then a digital pattern may be generated where each state includes a specific on/off condition for each color, so that N bits may be transmitted in parallel. This allows for a significant expansion in the quantity of data that may be downlinked at a given frame rate. However, a ground station 60 must be equipped with the capacity to discriminate between different colors, so a basic binary mode 85 may be preferred at certain times for allowing data capture from simpler light sensors 64 and a wider set of ground stations 60. In the preferred embodiment, four distinguishable light source color elements are available (white, red, green and blue), and when transmitting in this mode, the datastream consists of a series of symbols each having sixteen states (that is, representing four bits in parallel).

Analog Mode 87: In this mode, data is formatted as a sequence of analog values, or digital values within a numerical range. The white signal 70 spacecraft light source is used as a calibration level 78 reference, and is held at a steady intensity, while the data values are reproduced with variable intensity of the light source of other colors. Each state is maintained for a duration at least 1× or 2× the expected frame rate of the ground station light sensor 64. The ground detector includes the capacity to differentiate color, typically by a spectrometer, color sensitive imaging elements, or a holographic diffraction grating. In each frame, the intensity of the calibration level 78 source is used to scale the apparent intensity of the data signals, to correct for errors such as variations in light transmittal through the atmosphere or variations in radiance patterns with spacecraft attitude and viewing angle. Evidently, other color assignments may be used, and the selection of a calibration light source with a narrow emission spectrum may be advantageous for certain light sensors and data reduction methods.

In another variation, binary mode 86 and analog mode 87 transmissions may be mixed in parallel, using the white signal 70 LED's as a calibration level 78 reference, and using at least one color for binary data, and at least one other color for analog data.

In another variation, when information may be transmitted with a single color (such as beacon mode 88 or basic binary mode 85), the control system may use a different color on different satellite faces 20. In this case, ground station 60 equipment can analyze the spectrum to determine the orientation and spin rate of the satellite 50, without requiring an attitude determination system on the satellite 50, or any additional data downlink capacity.

Downlink Data Transmission Triggers

To reduce power consumption and increase the life of the light source, it is advantageous to minimize the duration of downlink activation. As a starting point, it is reasonable to suppress downlink radiation while the satellite 50 is illuminated by the sun 44, because reflected sunlight may overwhelm the artificial illumination and interfere with the capacity of a ground station 60 to detect or analyze the artificial signal. More generally, it is advantageous to choose downlink activation periods when the satellite 50 is in eclipse 46, activate the optical downlink during these downlink activation periods, and deactivate the optical downlink at other times. Downlink activation periods may be selected by the satellite 50 in accordance with criteria such as eclipse 46 status, line of sight path to selected ground stations 60 or Earth surface regions, periodicity to allow for regular background communications opportunities, power budget, and similar factors. Similarly, downlink activation periods may be selected at a ground station 60, and uplinked to the spacecraft by radio.

It is beneficial to reduce the portion of eclipse 46 during which the downlink system is operational. There are several ways to select times for transmission. The preferred embodiment employs several triggers to initiate the transmission of downlink data. Alternative embodiments may employ any one of these triggers, or any combination of triggers.

In a first trigger condition, the satellite 50 includes a radio receiver for uplink communications, and activates the downlink system in response to commands from the ground. Such commands may include a direct "transmit now" instruction, or programming for future times to initiate a downlink session. Commands may also specify specific pieces of data to downlink, allowing for efficient use of the limited data throughput of the downlink system.

In a second trigger condition, the downlink system is activated at periodic intervals during eclipse 46. From the perspective of a ground station 60 beneath a typical satellite 50 in low Earth orbit, the satellite 50 will cross the sky at an angular rate of approximately one degree per second, and will be reasonably high in the sky for a period of two minutes or longer. Therefore, for example, a satellite 50 that broadcasts a 12-second databurst at two-minute intervals can obtain a 10 percent duty cycle—active for 10 percent of the eclipse 46 interval, and quiescent for 90 percent of the eclipse 46 interval—while still supporting communications to an arbitrarily placed ground station 60, without requiring the satellite 50 to have knowledge of its position, or the position of a ground station 60, or the time when satellite 50 is within line of sight to ground station 60. To further reduce the duty cycle, the satellite 50 can be configured to transmit at long intervals that do not guarantee visibility on every overflight of an arbitrarily located ground station 60.

In a third trigger condition, the downlink system is activated for a short duration following eclipse 46 entry, as the satellite 50 moves along the satellite orbit 40. At this time, the spacecraft batteries will be fully charged, and ground observers have the benefit of initially locating the spacecraft while it is illuminated by sunlight and relatively bright and then tracking the satellite 50 into eclipse 46. In addition, from the orbital elements, eclipse entry times may be calculated, so it is known when the satellite 50 transmissions will occur.

The preferred embodiment uses each of these three triggers to initiate a downlink session, including a combination of transmission modes as appropriate to the mission and energy budget. Between transmission sessions, to the extent allowable given power resources, the satellite 50 operates in beacon mode 88 to support detection of the satellite 50 at other times.

In a fourth trigger condition, omitted in the preferred embodiment, the satellite 50 has a positional determination system, such as a GPS receiver, and the satellite 50 knows the geographic positions of likely ground stations 60. The satellite 50 control system calculates whether a ground station 60 is within line of sight, activates the downlink system if this is true, and keeps the light source off otherwise. The position of likely ground stations may be specific (e.g. Kitt Peak National Observatory in Arizona) or general (the region between latitudes 28N-45N and longitudes 70W-130W). If specific ground station 60 positions are known, and the satellite 50 has an attitude determination system, this has the further benefit of allowing a satellite 50 with the capacity of radiating in any direction to select LED's for activation that are specifically oriented in the direction of the ground station 60. If the satellite 50 has an attitude control system, it is desirable to orient a light source towards the ground station. This allows for the use of a single light source with a relatively narrow range of illumination.

Similarly, if the satellite 50 knows the positions of astronomical sensors that should not be subject to interference (e.g. Mauna Kea, Hawaii), the satellite 50 may specifically suppress downlink activity while within line-of-sight of these protected sites.

These options may be combined in various fashions. For example, a satellite 50 may initiate a downlink for an interval of 120 seconds following eclipse 46 entry, and at other times in response to an uplink command. Such a combination provides robustness against receiver failure, preserves the option of downlink on any overflight, and minimizes the light source duty cycle to maximize the lifetime of the downlink system.

Radiation Patterns

In the preferred embodiment, the satellite 50 usually transmits an isotropic radiation pattern 80. For each available downlink color, sufficient light source elements are available to send light in all directions, and with an approximately even distribution in all directions. All light source elements of a similar color are activated and de-activated in unison.

A significant advantage of an isotropic radiation pattern 80 is that successful communication does not depend on the spacecraft's knowledge or control of its orientation in space (commonly known as the spacecraft's 'attitude'). This is beneficial for the operation extremely small spacecraft that lack an attitude determination and control subsystem (ADCS), potentially allowing for the elimination of ADCS from spacecraft that have no requirements for attitude control besides communications. In addition, lack of reliance on ADCS is useful for operation of a beacon transmitter on larger spacecraft incorporating ADCS in normal operations; in the event of ADCS failure, an isotropic or near-isotropic radiation pattern for downlink of small quantities of engineering data over a backup beacon transmitter is generally considered good engineering practice.

By not requiring ADCS for downlink, system complexity is transferred from the satellite 50 to the ground station 60. This is advantageous, because ground system 60 complexity is relatively inexpensive, since it can be obtained without the expense of launching mass to orbit, and ground station 60 equipment is accessible to maintenance. In addition, complexity in a single ground station 60 can support the receipt of communications from multiple spacecraft. This is particularly useful when monitoring a fleet of small simple 'microsatellites' or 'nanosatellites', where each space platform is designed to have minimal complexity.

However, radiation in directions away from Earth 42 is not beneficial for transmission to_ground stations 60. In general, for a typical low Earth orbit spacecraft, this wasted energy includes about half of the total light output. Therefore, it is advantageous to determine the direction of Earth 42, and suppress light output in directions away from Earth 42, thereby generating a non-isotropic radiation pattern 81 directed towards Earth 42. Even without knowledge of ground station 60 locations, for some applications, it may be advantageous to send light towards a smaller cone near the sub-satellite point 48, where the satellite 50 is near the zenith (and therefore range is minimized), at the cost of not sending light towards the horizon (where the range is higher, and communications more difficult). Such a configuration is illustrated as non-isotropic radiation pattern 82. By restricting radiation to the Earth 42, or directions in a region near the sub-satellite point 48, the power consumption is reduced for a particular apparent satellite 50 brightness, or conversely the satellite 50 artificial light may be made to appear brighter from Earth 42 without using additional power.

The attitude determination for these non-isotropic radiation patterns is extremely imprecise compared to traditional laser optical downlink methods, where precise, alignment to a specific ground station location is required, and difficult to maintain. In this invention, the only attitude information needed is a general sense of which side of the spacecraft is currently aimed towards the Earth 42. Unlike a laser downlink system, the present invention may be employed by a satellite 50 without an attitude control system, through the use of isotropic or unidirectional radiation patterns.

The broad beam, achieved with the use of an uncollimated light source, presents certain operational advantages relative to laser technology. Lasers enable point-to-point communications systems, not point-to-region communications systems. A laser signal is transmitted in an extremely narrow beam to a ground station, typically illuminating a region on the Earth's surface less than 1,000 feet in diameter. In contrast, the present invention can illuminate the entire region of Earth 42 within line of sight to the satellite 50, as in isotropic radiation pattern 80 or non-isotropic radiation pattern 81 directed towards Earth 42. This enables communications without advance knowledge of the ground station 60 locations, and without a pointing system capable of precisely tracking a ground station 60 from a platform typically moving at seven kilometers per second. This also makes possible simultaneous observations from widely separated ground station 60 locations, beneficial in the event of clouds or poor weather at a single observing site. Further, by broadcasting to a region and not to specific predefined ground stations, it is possible for amateur astronomers to independently monitor a satellite 50 and collect data from locations not known to a spacecraft control center. Even with a broad beam non-isotropic radiation pattern 82 directed near the sub-satellite point 48, the locations of ground stations 60 do not need to be known in advance, because the beam will paint large regions of the Earth's surface as satellite 50 moves along satellite orbit 40, and for an arbitrary location passing through this beam, a reception window is available typically lasting many seconds to a few minutes even without any tracking from the satellite 50. Traditionally, radio has been the assumed mode of operation for achieving point-to-region satellite downlink.

In the preferred embodiment, the satellite 50 cycles between an isotropic radiation pattern 80 and a non-isotropic radiation pattern 81. The spacecraft control system monitors infrared intensity from Earth sensors 22 distributed around the spacecraft faces 20, and power generation levels from solar cells 24 distributed around the spacecraft faces 20, to discriminate the likely positions of Earth 42 and Sun 44. The satellite 50 may optionally model its dynamics and determine a spin rate and orientation from these measurements, or the satellite 50 may rely on real-time observations. When using a non-isotropic radiation pattern, the satellite 50 suppresses activation of light source elements on satellite faces 20 believed to point away from Earth 42 or sub-satellite point 48.

If the satellite 50 has multiple light sources aimed in various directions, and the control system has not selected a specific light source to illuminate, then to reduce instantaneous power load, the control system may cycle between different light sources. From an instantaneous perspective, the result is a non-isotropic radiation pattern, although the cumulative effect of the cycling may approach or attain an isotropic communications opportunity pattern.

Satellite Orbit and Light Intensity

In a typical application, satellite orbit 40 will be a low Earth orbit, with an altitude in the range of 250 kilometers to 1600 kilometers. Although the peak visual magnitude of a light source on satellite 50 will be brighter at lower altitudes, satellite lifetime significantly declines due to atmospheric drag as satellite 50 passes through the imperfect vacuum of near-Earth space, the fraction of Earth's surface with line-of-sight visibility to satellite 50 declines, and viewing opportunities become shorter due to a higher apparent angular rate of motion in Earth's sky. At higher altitudes, the range from a ground station 60 to the satellite 50 increases, making the peak visual magnitude of satellite 50 fainter, and satellite 50 becomes harder to detect. For these reasons, the region from 250 kilometers to 1600 kilometers is envisioned as an optimal area of space for the application of the present invention. Lower perigee is undesirable due to atmospheric drag, however higher apogee poses no comparable problem, and communications may be conducted near perigee when satellite 50 has a favorable range to Earth 42.

When calculating the light intensity requirements for a satellite 50 employing the present invention, if the satellite 50 has a circular satellite orbit 40, the range used in the equation for visual magnitude should equal or exceed the spacecraft's orbital altitude. Attention should be given to the 'longitude increment' (distance between groundtracks on successive orbits), since the satellite orbit 40 may not be aligned for a direct overflight of the ground station 60, so the closest approach of the satellite 50 to the ground station 60 may exceed the orbital altitude. In addition, attention should be given to the duration of communications required for the collection of a minimum quantity of data, since an extended observation would require communications before and after the spacecraft's closest approach on a given orbital pass, so the satellite 50 would be at a greater range at the start and end of a communications session than at closest approach to the ground station 60. If the spacecraft's orbital inclination (maximum latitude of the spacecraft's sub-satellite point 48 during each satellite orbit 40) is lower than the latitude of an anticipated ground station 60, attention should be given to the additional distance required to see the satellite 50 from this location, where the satellite 50 never flies overhead. The combination of these factors may be used to determine the range requirements for the communications system. Margin beyond this limit is desirable, to accommodate poor seeing conditions, collection of additional data, and degradation of light source intensity during satellite 50 operation beyond the mission design lifetime.

If the satellite 50 has a non-circular ('eccentric') satellite orbit 40, the minimum range should equal the spacecraft's perigee altitude (closest approach to Earth during each orbit). For highly eccentric orbits, such as Geostationary Transfer Orbits (GTO) or Molniya orbits, it may be impractical to conduct communications when the satellite 50 is in the higher altitude segments of its orbital path, and it may be desirable to use multiple or mobile ground station 60 locations so that observations may be made at locations with favorable views of the satellite 50 at perigee.

Ground Station

In the preferred embodiment, a telescope 62 at a ground station 60 is used to observe the satellite 50 downlink. To orient the telescope 62 towards the satellite 50, a control system uses software to determine the expected position of the satellite 50 in the sky, as seen from the ground station 60. This may include a timing reference clock, and a computer configured to translate time, geographic information, and satellite orbital parameters to an estimated satellite position, typically expressed in right ascension and declination, or azimuth and elevation. Satellites in near Earth orbit, where downlink through artificial light is most practical (due to the relatively small ranges), move rapidly across the sky. This is quite different from geostationary communications satellites, which are effectively motionless from the perspective of a ground station 60.

Orbital parameters for satellites in Earth orbit can be obtained from several sources, including the United States Air Force Space Command, which uses radar to track orbiting satellites and space debris. These parameters, also called 'orbital elements', are often called "elsets" (element sets) or "TLE's" (two-line elements) in reference to the publication format used by Space Command. There are several sources of existing software for determining the apparent position of a satellite, as seen from a specific ground station at a specific time, from a satellites's TLE. The calculations are typically performed with the SGP4 algorithm.

If the satellite 50 is configured to initiate optical downlink on receipt of an uplink radio command, or change downlink modes or content in response to an uplink radio command, the ground station 60 may include a radio transmitter, and send an appropriate command to the satellite. Alternatively, commands requesting a downlink session at a particular time may be uplinked to the satellite 50 in advance from a satellite control center.

A satellite 50 may be detected within the field of view of the telescope 62 automatically or manually. A typical automatic detection system compares frames and detects light sources moving with a predicted direction and angular rate in accordance with calculations of the satellite's orbital properties. A typical manual detection system provides an observer with a view through the telescope, either optically or indirectly through an imaging sensor, and provides a feedback mechanism for the observer to indicate the presence or position of the satellite within the field of view.

Once the satellite 50 has been acquired, to keep the satellite 50 in the field of view for any significant time, it is advantageous to use a feedback system that automatically slews the telescope 62 to track the satellite 50. This may be done through sensor data, where the satellite 50 is discriminated from background stars 49 by virtue of its motion relative to the background stars 49 and/or relative to directional or celestial co-ordinates. Then the telescope aiming system 68 is adjusted to follow the actual path of the satellite 50 as it moves against the background stars 49, and to correct for any initial pointing errors in the telescope 62 system. To a large extent, this motion can be projected into the future from observed prior motion, since the angular direction and rate of motion is nearly constant over a short interval for a satellite 50 following an orbital trajectory. In addition, the motion follows a predictable path that can be calculated from the known orbital elements, preferably in conjunction with an observed time offset, such as the offset in seconds of time between the spacecraft's predicted and observed position along its orbit. Tracking with the telescope may be continuous, in which case the satellite 50 is kept within the field of view of telescope 62, or in steps to a series of discrete aiming positions along the sky path of satellite 50, in which case satellite 50 passes through the field of view of telescope 62 and this process is repeated as desired to collect additional data.

In the preferred embodiment, the telescope 62 includes a control system that computes the satellite's expected position from the time, ground station coordinates, and satellite element set. The control system repeatedly conducts this computation, and adjusts the telescope aiming to keep the satellite 50 in the field of view. The computation may be performed locally, or may be performed by network query to a remote computer with orbital element information. Such an automatic tracking system may be supplemented with manual feedback from an observer monitoring the view through the telescope 62, either optically or indirectly through an imaging sensor, to correct for aiming or tracking errors in the telescope aiming system. Other methods are known for automatically tracking an illuminated satellite through a telescope.

Satellites may drift away from their expected position in space for a variety of reasons, including deliberate propulsion or orbital adjustment, the pressure of sunlight, and drag from passage through remnants of the Earth's atmosphere in the imperfect vacuum of near-Earth space. These effects, in general, do not significantly affect the spacecraft's orbital plane, but induce a shift ahead or behind the expected position along the spacecraft's orbital path. As a result, the satellite 50 may arrive early or late, relative to the expected timing. This time shift will be nearly constant throughout a single observing session, and can be factored into the positional calculations through introduction of a timing offset parameter. Therefore, once the satellite 50 is acquired, the apparent time shift may be determined and applied for continued tracking of the object through the telescope 62.

The satellite 50 is detected in a light sensor 64 at the telescope 62 focal plane. The light sensor 64 may be a video recording system, charged coupled device (CCD), photometer, photographic plate, or other electromagnetic sensing device. For separation of spectrally distinct signals, use of a color sensitive sensor, or a device for separating colors such as a spectrometer or holographic diffraction grating, is preferred. For maximum sensitivity to faint signals, a sensor that responds to a wide range of frequencies is preferred. A photomultiplier tube may be inserted into the light path to aid in detection of faint signals. If the spectral characteristics of the uncollimated light source are known, a filter may be inserted to reject light outside the spectral range of interest.

Satellite 50 may be recorded on a time exposure photograph, where position on the photographic image corresponds to time in accordance with the spacecraft's position as it moved through the field of view, and data is reconstructed by measurement of light intensity at points or regions along the satellite's photographic track. If desired, a series of such photographs may be taken recording satellite 50 in different regions of the sky during a satellite pass, to collect additional data.

Due to the distance between ground station 60 and satellite 50, the illumination from satellite 50 will typically appear starlike or pointlike, even through telescope 62. In this case, the satellite will have no visible angular size, and detail on the satellite 50 will be lost or invisible. In effect, all light from satellite 50 will appear to come from a single point, and at a given instant, all the light will fall collectively on a single position on the imaging sensor.

An imaging sensor with positional sensitivity is advantageous for discriminating light from satellite 50 and light from background stars 49, on account of their angular separation in the sky, and also for ensuring the continued collection of data provided satellite 50 remains somewhere in the field of view of telescope 62. If light sensor 64 includes a spectrometer, then evidently the light may be diverted in accordance with frequency, so position on an imaging sensor may correspond to different colors from satellite 50. But an imaging sensor is not advantageous for resolving details on satellite 50 and using positional information to augment the data stream information capacity. A satellite 50 light source rendering an image, such as a video display screen, cannot usefully send information through a presentation of an image, due to the distance to ground station 60. However, if the spectral characteristics or brightness of the display screen illumination can be controlled, then variations in spectrum or intensity may be used to convey data.

For a satellite 50 in non-geostationary orbit, the telescope 62 is moved to track the satellite 50 for an extended time during a satellite viewing opportunity. During this period, light sensor 64 data is recorded for reduction of the datastream transmitted from the satellite 50, a step that may be done in near real-time or after the satellite viewing opportunity is complete.

If the satellite 50 transmission mode uses a reference calibration level 78 signal, the recording or reduction system normalizes the apparent intensity of other signals from the satellite 50 by a ratio, in each time interval, that maintains a constant effective measured intensity of the reference calibration level 78 signal. When using a calibration level 78 signal, it is advantageous for light sensor 64 to include elements with spectral sensitivity to the light source used for calibration level 78, but insensitive to frequencies used simultaneously for downlink of other data signals from satellite 50. This allows for subtraction of the calibration level 78 signal at all wavelengths at which this light source radiates, potentially including spectral regions used simultaneously for data downlink from satellite 50. Depending on the spectral response at light sensor 64, it may be advantageous to use either a white or single-color light source for calibration level 78.

It is advantageous to have a wide field of view through the telescope 62, on the order of one angular degree, so that the satellite 50 can be detected even in the presence of significant telescope 62 pointing errors, or errors in the orbital elements used to calculate the satellite's expected position in the sky. Note that this representative field of view is about 1,000 times wider than the field of view used in a typical satellite laser signal detection system.

Alternative Embodiments

In the preferred embodiment, the LED light sources are positioned on the satellite faces 20 of a spacecraft structure, such as an icosadedron. Other spacecraft configurations may evidently be employed, including cubes, spheres, dodecahedrons, cylinders, and other shapes.

In an alternative embodiment, a light source is placed on a boom or rod extending away from the main spacecraft structure, so that the radiating elements may be closely clustered, with the spacecraft structure located at some distance so that it blocks a minimal portion of sky from the radiation pattern. This allows for efficient use of light sources that have a naturally isotropic pattern, or are diffused to such a pattern.

In an alternative embodiment, the satellite 50 uses a passive "gravity gradient" attitude control system. Due to tidal effects, a rod-shaped spacecraft in Earth orbit will preferentially orient itself so the long axis is pointed towards the Earth 42. On the expectation that a spacecraft of this shape will drift into this orientation, it is assumed that one of the two end faces will point near the sub-satellite point 48, the location on Earth 42 with minimum range to the satellite 50, where the satellite 50 appears at that moment directly overhead.

As the satellite 50 moves along its satellite orbit 40, the sub-satellite point 48 moves rapidly across the surface of the Earth 42. Neglecting orbital resonance effects that may induce repeating groundtracks, it is generally true that the sub-satellite point 48 will move across all points on the surface of Earth 42 with a latitude equal or less than the spacecraft's orbital inclination. Therefore, a satellite 50 with the capacity of communication with ground stations at or near the sub-satellite point 48 will usually have regular communications opportunities with an appropriately situated ground station 60, without any attempt by the satellite 50 to know its position in space, or the ground station 60 position on Earth 42.

For a communications system of this type, the gravity gradient attitude naturally allows for generation of a non-isotropic radiation pattern 82 directed towards the sub-satellite point 48, with significant benefits for power consumption and spacecraft complexity. In particular, radiation in directions away from the long axis of the spacecraft may be omitted, because these directions will never point towards the sub-satellite point 48 (once the satellite 50 has reached a natural gravity gradient equilibrium).

Further, the spacecraft control system can usually determine which end of the satellite 50 is oriented towards Earth 42. With a photocell positioned on each end of the spacecraft, when the spacecraft is in eclipse 46 (so light from the Sun 44 is not present), the brightest source of illumination is Earth 42 (during those times near satellite 50 eclipse 46 entry or exit, when part of the visible portion of Earth 42 is in daylight). Additionally, Earth 42 radiates at characteristic infrared frequencies that may be detected. An Earth sensor 22 may be used to determine which end of the satellite 50 is directed near the sub-satellite point 48. In an alternative embodiment, 'Earth sensor' functionality may be obtained through measurement of power generation from solar cells 24, coupled with knowledge of the solar cell 24 orientation relative to the spacecraft structure.

Once the spacecraft control system determines which end of the satellite 50 is pointed towards Earth 42, it can suppress any light sources that radiate in other directions. By activating only a light source aimed towards the sub-satellite point 48, the apparent brightness from an active ground station 60 will be maintained near full strength, while minimizing power consumption. Since the gravity gradient effect may result in the satellite 50 adopting either of two orientations (either end may be pointed towards Earth 42), the satellite should include two light sources, or sets of light sources, one on each end, even though only one LED or LED cluster will be used operationally by the settled satellite 50. LED's aimed in other directions are not required, and omission is beneficial for reducing system complexity and mass, although they may be beneficial in the interval after launch before tidal effects have brought the satellite 50 into a stable attitude.

In the preferred embodiment, the source of uncollimated light is an artificial light generation device on the satellite 50. In an alternative embodiment, information is transmitted from a satellite 50 to an Earth ground station 60 through the impression of data on the apparent intensity of reflected sunlight from the satellite 50. This variation omits the artificial light source, and instead uses a reflective light source, a controllable mechanism for adjusting the effective albedo of the spacecraft. Data is transmitted during the sunlit portion of the satellite orbit 40, and as before, the satellite is tracked from a ground station 60 using a telescope 62 with a light sensor 64, such as a video recorder, to capture the datastream. Unlike the preferred embodiment where artificial light is generated to send downlink communications while the satellite is in eclipse 46, when using reflected sunlight to transmit data, the satellite 50 downlink communications are conducted when the satellite 50 is not in eclipse 46. A combination of these two transmission modes, modulation of artificial light and modulation of solar reflectance flux to the Earth 42, may be applied if the satellite 50 is observed while entering or exiting the eclipse 46 region.

In an alternative embodiment modulating the effective albedo or reflective flux of satellite 50, using a rod-shaped gravity gradient stabilized satellite 50 as illustrated in FIG. 9, a significant fraction of the side surface area of a cylinder is coated with a substance, such as an electrochromic material, with reflectance or spectral characteristics controllable by main CPU 56 and set to a particular brightness, darkness or color. Such electrochromic materials are commonly used for "smart window" technologies that control the amount of light or heat allowed to pass through a surface. The spacecraft control system, such as main CPU 56, sets the reflectiveness of the surface between white and black, or select among various colors, with consequent changes to the apparent brightness of the satellite 50 as seen through a telescope 62.

The electrochromic material can be located in various places on the spacecraft structure, provided it forms a significant fraction of the viewable surface area of satellite 50, as seen from ground station 60. For example, another placement would be on exterior panels similar to solar cell panels used on many spacecraft, possibly with a selectable orientation to ensure a favorable angle of visibility from Earth 42. If the electrochromic material transitions to a clear surface, additional layers of electrochromic material, or a white, black or colored surface, or a mirror, may be placed behind the material. In place of the exemplary electrochromic material, other means may be used to alter the effective albedo of satellite 50. For example, a liquid crystal display (LCD) screen may be used for affecting the collective reflectance of satellite 50, a function distinct from the traditional use of an LCD for rendering text, images, or other pixel-based content.

For a downlink method employing modulation of radiative flux, for instance through the modulation of albedo through control of an electrochromic surface, a gravity-gradient configuration of satellite 50 is advantageous because a significant surface area can be presented in an orientation that is naturally stable and predictable from satellite dynamics. However, it is evident that this aspect of the present invention may be utilized in any spacecraft dynamical and structural configuration. For example, with an icosahedral structure as illustrated in FIG. 1, an electrochromic surface may be placed on each of satellite faces 20, where such surfaces serve as an uncollimated light source that may be be modulated to downlink data to a ground station 60. This may be in place of white LED 30, red LED 32, green LED 34 and blue LED 36, or as a supplementary light source for use preferably for use while satellite 50 is in view of sun 44 and not in eclipse 46.

In the foregoing examples, if satellite 50 includes a panel with selectable orientation to ensure a favorable angle of visibility from Earth 42, the reflective flux may be additionally affected by moving the panel so that a greater or smaller surface area is presented to ground station 60, thereby aiding in the modulation of the reflective light source. Alternatively, such modulation through angular adjustment may be implemented without electrochromic materials or adjustment to the true albedo of the panel with adjustable orientation. For example, if satellite 50 includes a mirror with a controllable angle, the spacecraft may encode data through manipulation of the mirror angle, changing the apparent brightness of the satellite 50 as seen from ground station 60. In another application, the satellite 50 includes a rotating reflective element with a controllable rotation period. Data is encoded in the rotation period of this surface, in a manner analogous to the encoding method described for the use of a strobe light, where information is represented by the precise elapsed time between two events, as in flash timing interval 83 of beacon mode 88. If the rotation rate is left stable for an extended period, only a single data parameter may be transmitted using this method.

To communicate through light, it is beneficial to generate a light source of the maximum possible radiance. The light from a continuous source, such as an LED, is relatively spread out through time. A higher peak radiance is possible through an instantaneous flash source, such as a strobe light or xenon flash tube. This type of flash source may be visible with smaller ground station 60 equipment, or at a larger range, making this technique particularly useful for spacecraft operating at higher altitudes. By their nature, a flash source does not permit transmission of simple binary data, because the source cannot be activated and deactivated at arbitrary short intervals. Instead, a charge time is required to bring the flash source to readiness, and the accumulated charge is released in a brief event. If satellite 50 includes a plurality of strobe lights, spacing requirements due to charge time can be overcome, to allow for more frequent or closely packed strobe events.

Data may be encoded with a flash source, such as a strobe light or xenon flash tube, in several ways. First, if the satellite 50 has an accurate reference clock (such as a GPS receiver), the exact time of illumination may convey data (e.g. transmission at 27.42 seconds after the minute indicates a number 2742 in the range 0-5999). Second, without an accurate reference clock (but an accurate timer), the satellite 50 may use a sequence of two flashes where the interflash interval represents data, as in flash timing interval 83 of beacon mode 88. Third, with a radio uplink receiver, receipt of a transmission command (which can specify a particular piece of data to downlink) can be used as the initial timing reference, with the duration from this radio uplink time until flash generation representing data. Fourth, the presence or absence of a flash within a series of "time windows" at large intervals may be used to represent each bit. The datarate of these methods is inferior to some methods presented using LED's or continuous light sources, but the stronger radiance from the spacecraft may make it desirable under some circumstances.

It is advantageous for the ground station 60 to be located on the night side of the Earth, viewing satellite 50 while the spacecraft is in eclipse 46. These conditions, an illuminated satellite 50 in line of sight to a ground station 60 in the nighttime portion of Earth 42, are typically found shortly after dusk and before dawn. If ground station 60 is located on the daytime portion of Earth 42, sunlight scattered in the atmosphere creates a bright background impeding the detection of faint illumination from satellite 50 and background stars 49. However, if a light source of satellite 50 is exceptionally bright or luminous, detection at a daytime ground station is possible. For example, astronomical techniques are known for observing stars of the first magnitude in the daytime, and a satellite of similar brightness could also be detected. In an alternative embodiment, the present invention may be employed when the receive terminal is not located on Earth 42, but on a separate spacecraft. In this case, satellite 50 detection may be through a telescope, camera system, star tracker of a type that may be found in space navigation systems, or photometer of a type that may be found in certain astrometric packages.

RAMIFICATIONS AND SCOPE

Accordingly, the reader will see that the present invention enables the optical satellite downlink in a broad beam or isotropic signal. Further, this technique is simple and efficient, and is functional without a high-resolution pointing capacity, or even without any attitude control. These features are especially useful for primary downlink on simple microsatellites, and safemode beacon downlink on other satellites.

While the above description includes many specificities, these should not be construed as limitations on the scope of the invention, but rather as an exemplification of one preferred embodiment thereof. The variants presented in the alternative embodiments, as well as the elements mentioned in the dependent claims, may be combined in various combinations obvious to a person with ordinary skill in the art, in light of the concepts described and suggested herein, and such variants are intended to fall within the scope of the present invention. Many other variations are also possible. Accordingly, the scope of the invention should be determined not by the embodiments illustrated, but by the appended claims and their legal equivalents.

We claim:

1. A method for optical downlink from a satellite including at least a first uncollimated light source and a data generation system, comprising the steps of:
   (a) generating a data stream with said data generation system,
   (b) choosing downlink activation periods during which said satellite is in eclipse, and
   (c) modulating said first uncollimated light source to represent said data stream during said downlink activation periods, and deactivating said first uncollimated light source at other times.

2. The method of claim 1, wherein said data stream comprises a sequence of symbols with at least two discrete symbol values, and modulation of said first uncollimated light source comprises setting said first uncollimated light source to a first luminous flux value to represent a first symbol value, and setting said first uncollimated light source to a second luminous flux value to represent a second symbol value.

3. The method of claim 1, wherein said satellite further includes a second uncollimated light source, the spectral characteristics of said first uncollimated light source are different from the spectral characteristics of said second uncollimated light source, and said second uncollimated light source is maintained at a constant luminous flux while said first uncollimated light source is modulated to represent said data stream.

4. The method of claim 1, wherein the duration between transitions in the luminous flux of said first uncollimated light source represents said data stream.

5. The method of claim 1, wherein said satellite further includes a sunlight sensor for detecting the presence of solar illumination, and where modulation of said first uncollimated light source is suppressed while solar illumination is present.

6. A method for recording a data stream optically transmitted from a satellite through patterns of uncollimated light, at a telescope including a telescope aiming system and focal plane light sensor, comprising the steps of
   (a) calculating the angular position of said satellite from the physical position of said telescope and orbital parameters of said satellite,
   (b) aiming said telescope at said angular position of said satellite, with said telescope aiming system,
   (c) detecting said satellite in said focal plane light sensor,
   (d) tracking said satellite by aiming said telescope to follow the angular position of said satellite, and
   (e) recording data from said focal plane light sensor, including said data stream optically transmitted from said satellite through patterns of uncollimated light.

7. The method of claim 6, where said light sensor includes an imaging detector.

8. The method of claim 6, where said satellite includes a plurality of uncollimated light sources with distinct spectral characteristics, the data stream is divided into parallel streams conveyed through patterns on separate uncollimated light sources, and said light sensor includes a plurality of sensors with distinct spectral characteristics for distinguishing light from among the plurality of uncollimated light sources.

9. The method of claim 6, where said satellite includes a plurality of uncollimated light sources with distinct spectral characteristics, the light sensor includes a plurality of sensors with distinct spectral characteristics for distinguishing light from among the plurality of uncollimated light sources, and the recorded intensity of the satellite in a first spectral characteristic is normalized by a value that maintains a constant recorded intensity in the second spectral characteristic.

10. The method of claim 6, where said satellite includes a plurality of uncollimated light sources with distinct spectral characteristics, and said light sensor includes a spectrometer for distinguishing light from among the plurality of uncollimated light sources.

11. A method for optical downlink from a satellite including at least a first uncollimated light source and a data generation system, comprising the steps of:
    (a) generating a data stream with said data generation system, wherein said data stream comprises a sequence of symbols with at least two discrete symbol values, and
    (b) modulating said first uncollimated light source to represent said data stream, wherein modulation comprises setting said first uncollimated light source to a first luminous flux value to represent a first symbol value, and setting said first uncollimated light source to a second luminous flux value to represent a second symbol value.

12. The method of claim 11, wherein the radiation pattern of said first uncollimated light source is isotropic.

13. The method of claim 11, wherein the radiation pattern of said first uncollimated light source is a broad beam with maximum intensity on the Earth's surface near the point directly below said satellite along the line connecting said satellite and the center of the Earth, and the point on the Earth's surface directly below said satellite is in motion with respect to the surface of the Earth.

14. The method of claim 11, wherein the satellite further includes an attitude determination system and a plurality of uncollimated light sources with different radiation patterns in the frame of reference of the spacecraft structure, further including the step of selecting uncollimated light sources oriented towards Earth from the plurality of uncollimated light sources, and modulating selected uncollimated light sources oriented towards Earth, while uncollimated light sources not oriented towards Earth are deactivated.

15. The method of claim 11, wherein said satellite includes a plurality of uncollimated light sources where the spectral characteristics of each uncollimated light source is unique within said plurality of uncollimated light sources, said data stream comprises a sequence of frames each comprising a group of symbols with at least two discrete symbol values, where each symbol position within a frame is assigned to at least one uncollimated light source, and modulation of each uncollimated light source comprises setting the source to a first luminous flux value to represent a first symbol value, and setting the source to a second luminous flux value to represent a second symbol value.

16. The method of claim 11, wherein said first uncollimated light source is modulated when said satellite is in eclipse, and deactivated when said satellite is not in eclipse.

17. The method of claim 11, wherein said first uncollimated light source includes at least one light emitting diode.

18. The method of claim 11, wherein said first uncollimated light source includes a surface with variable reflective flux, and the step of modulating said first uncollimated light source comprises modulating the reflective flux of solar illumination towards Earth.

19. A method for optical downlink from a satellite including at least a first uncollimated light source, a second uncollimated light source with spectral characteristics different from said first uncollimated light source, and a data generation system, comprising the steps of:
    (a) generating a data stream with said data generation system, and
    (b) modulating said first uncollimated light source to represent said data stream while said second uncollimated light source is maintained at a constant luminous flux.

20. A method for optical downlink from a satellite including a data generation system and at least a first uncollimated light source including a surface with variable reflective flux, comprising the steps of:
(a) generating a data stream with said data generation system, and
(b) modulating said first uncollimated light source to represent said data stream, including modulating the reflective flux of solar illumination towards Earth.